United States Patent [19]

Takayanagi et al.

[11] Patent Number: 5,619,623
[45] Date of Patent: Apr. 8, 1997

[54] METHOD AND DEVICE FOR TRANSMITTING AND PROCESSING PRINT DATA USED FOR PRINTER

[75] Inventors: Toshihiro Takayanagi, Okazaki; Kenji Yanase; Kiyoji Muramatsu, both of Nagoya, all of Japan

[73] Assignee: Brother Kogyo Kabushiki Kaisha, Aichi-ken, Japan

[21] Appl. No.: 305,321

[22] Filed: Sep. 15, 1994

[30] Foreign Application Priority Data

| Sep. 21, 1993 | [JP] | Japan | 5-234476 |
| Sep. 21, 1993 | [JP] | Japan | 5-234477 |
| Sep. 21, 1993 | [JP] | Japan | 5-234478 |

[51] Int. Cl.$^6$ .................................................. G06K 15/00
[52] U.S. Cl. ........................................... 395/114; 395/115
[58] Field of Search .................................... 395/101, 112, 395/114, 115, 116, 109, 110, 111, 164, 165, 166, 117, 133, 140, 141, 147, 148, 427, 432, 435, 438, 439, 497.01, 497.04; 358/404, 444, 462, 467; 347/142; 382/190, 191; 400/61–62, 70, 76

[56] References Cited

U.S. PATENT DOCUMENTS

| 4,722,064 | 1/1988 | Suzuki | 395/114 |
| 5,197,123 | 3/1993 | Nagata et al. | 395/112 |
| 5,315,691 | 5/1994 | Sumiya et al. | 395/112 |
| 5,337,258 | 8/1994 | Dennis | 364/551.01 |
| 5,355,441 | 10/1994 | Kawai et al. | 395/115 |
| 5,408,589 | 4/1995 | Yamamoto | 395/115 |

*Primary Examiner*—Edward L. Coles, Sr.
*Assistant Examiner*—Dov Popovici
*Attorney, Agent, or Firm*—Oliff & Berridge

[57] ABSTRACT

A method and a device for transmitting print data from a computer to a print control device for controlling a printer, wherein a desired one of attribute data sets which accompany respective image data sets is replaceable by a new image data set in a data transmission mode of the computer, and the attribute data set accompanying the original image data set replaced by the new image data set is suitably changed according to the new image data set. The print data including the new image data set and the changed attribute data set are transmitted to the print control device. The print data may include direct image data such as bit map data, and non-direct image data which include indirect image data such as character data and graphic data, and print control data such as attribute data. When a file name of any direct image data stored in a memory is included in the non-direct image data, the direct image data are retrieved from the memory, and transmitted to the print control device such that the retrieved direct image data and the non-direct image data are not interspersed with each other.

9 Claims, 17 Drawing Sheets

METHOD AND DEVICE FOR TRANSMITTING AND PROCESSING PRINT DATA USED FOR PRINTER

BACKGROUND OF THE INVENTION

1. Field of the Invention

The present invention relates generally to a method of and a device for transmitting print data in the data transmission mode of the device to a print control device for controlling a printer, and also relates to such print control device. More particularly, this invention is concerned with a technique for partial replacement or change of image data included in the original print data before transmission of the changed image data to the print control device together with print control data changed so as to meet the partial replacement of the print data. The invention is also concerned with a technique for efficient transmission of the print data from a device such as a word processor incorporating a computer, and efficient processing of the print data received by the print control device.

2. Discussion of the Prior Art

A printing system is known, wherein a print control device is interposed between a computer (e.g., a computer built in a word processor) and a printer, for controlling the printer according to print data received from the computer. Generally, the print data include image data directly or indirectly representing images to be printed, and print control data including attribute data as well known in the art. The image data include direct image data such as bit map data, which are generated on the basis of an output of an image scanner, for example. The direct image data also include data obtained by compression of such bit map data. Such compressed direct image data may include, for instance, run-length codes well known in the art. The image data also include indirect image data such as character data or character codes representative of characters such as letters, symbols and numerals, and graphic data representative of graphic or pictorial representations including straight and curved lines. The graphic data may be referred to as "outline data" representative of outlines of images to be reproduced.

The known printing system of the type indicated above suffers from a problem when the user desires to partially replace or change the image data included in the original print data already prepared by and stored in the computer, after the computer is set in its data transmission mode. Namely, the entire print data should be prepared again even when the image data in the original print data are partially replaced by other image data. It takes a considerable time to edit the original print data in the data transmission mode of the computer. Usually, the print data include a large volume of image data, and a lot of time is required for the appropriate application program to read the entire volume of the print data during processing for partial change or replacement of the image data. Further, the change or replacement of the image data itself requires a large length of time. Thus, an operation to partially change or replace the original image data leads to reduced efficiency of the printing system. In some cases, the application program does not permit partial editing of the original print data, that is, requires preparation of an entirely new batch of print data as desired by the user.

The print control device used in some printing systems is adapted to use a page description language. In this type of printing system, the image data and the print control data which are included in the print data are transmitted from the computer to the print control device such that the image data and the print control data are interspersed with each other. The print control device converts each one-page portion of the print data received from the computer into a batch of raster image data, according to the print control data such as attribute data and various print control instructions. Each batch of raster image data is sent to the printer for printing of the corresponding page.

Keeping pace with recent enhancement of resolution of an image input or reading device such as an image scanner, the amount of the direct image data in the form of bit map data, for instance, tends to increase per unit area of the image. This means an increase in the total volume of the print data, and the print control device is required to search for the print control commands or instructions mixed or dispersed in the large volume of the bit map data, so that the bit map data are converted into the raster image data according to the print control commands or instructions. Therefore, the efficiency of processing of the print data by the print control device tends to be lowered, and the time required for the computer to transmit the print data to the print control device tends to increase due to the relatively low processing efficiency on the side of the print control device.

SUMMARY OF THE INVENTION

It is therefore a first object of the present invention to provide a method of transmitting print data from a computer to a print control device in the data transmission mode of the computer, which method permits easy change or replacement of image data included in already prepared or original print data before the print data are transmitted to the print control device.

It is a second object of the invention to provide a print data transmitting device suitable for practicing the method according to the first object.

It is a third object of the present invention to provide a method of transmitting print data including direct image data such as bit map data and non-direct image data such as print control data, from a computer to a print control device, which method permits efficient processing of the print data by the print control device, and reduced time of transmission of the print data from the computer to the print control device.

It is a fourth object of this invention to provide a print data transmitting device suitable for practicing the method according to the third object.

It is a fifth object of the present invention to provide a print control device which is interposed between a computer and a printer and which permits high-speed printing with high resolution of reproduced images, according to direct image data such as bit map data.

The first object indicated above may be achieved according to one aspect of the present invention, which provides a method of transmitting print data from a computer to a print control device in a data transmission mode of the computer, for controlling a printer, the method comprising: (a) a classifying step of classifying the print data into a plurality of sets of image data, and a plurality of sets of attribute data which accompany the sets of image data, respectively; (b) a replacing step of replacing each of at least one of the sets of image data by another set of image data stored in memory means, which another set of image data is included as a new set of image data in the print data; (c) a changing step of changing each set of attribute data which accompanies each original set of image data replaced by the new set of image data, on the basis of the new set of image data included in the print data in the replacing step; and (d) a transmitting step of transmitting to the print control device the print data including the new set of image data and the set of attribute data changed in the changing step.

The present print data transmitting method permits replacement of any desired sets of original image data of the print data by respective new sets of image data, and changing of the corresponding original attribute data sets to create new attribute data sets accompanying the new sets of image data, depending upon the new image data sets, while the computer is placed in the data transmission mode. The print data including each new image data set accompanied by the corresponding new attribute data set are transmitted to the print control device. Thus, upon replacement of a certain one or more sets of the original image data by a corresponding new set or sets of image data, the corresponding new set or sets of attribute data is/are created on the basis of the position, size, color and other parameters of the image represented by the corresponding new image data set. Thus, the print data to be transmitted to the print control device may be edited as needed in the data transmission mode of the computer.

Generally, the image data included in the print data comprise direct image data such as bit map data, and/or indirect image data such as character data representative of characters and graphic data representative of graphical representations.

Each set of attribute data accompanying each image data set include, for example, image position data, image size data, image color data and image rotation data which represent the position, size, color, and attitude of an image represented by the image data set, and file name data indicative of a name of an image of an image data set.

The replacing step indicated above may comprise: searching for a file name of each set of image data which is included in the sets of attribute data; presenting the file name to an operator of the computer; and prompting the operator to approve of printing of an image by the printer according to the set of image data identified by the file name, or replace the file name by another file for printing of an image according to the new set of image data identified by that another file name.

The file name of a new set of image data may be entered through a keyboard provided on the computer, or by using a directory or a linkage editor.

The transmitting step indicated above may comprise transmitting as a first batch of data the attribute data which include the above-indicated at least one set of attribute data changed in the changing step, and transmitting as a second batch of data the image data which include the new set of image data included in the print data in the replacing step, in a separate transmitting mode in which the first and second batches of data are not interspersed with each other.

The computer may be adapted to operate selectively in a separate transmitting mode or a non-separate transmitting mode. In the separate transmitting mode, the attribute data which include the above-indicated at least one set of attribute data changed in the changing step are transmitted as a first batch of data, and the image data which include the new set of image data included in the print data in the replacing step are transmitted as a second batch of data, such that the first and second batches of data are not interspersed with each other. In the non-separate transmitting mode, the attribute data and the image data are transmitted such that each set of attribute data accompanies the corresponding image data set.

Before the image data are transmitted, the format of any sets of image data included in the print data may be changed to another format compatible with the print control device.

The changing step indicated above may comprise changing the set of attribute data which accompanies each of the above-indicated at least one set of image data, on the basis of at least the resolution, size and format of the new set of image data.

The second object indicated above may be achieved according to a second aspect of this invention, which provides a print data transmitting device for transmitting print data from a computer to a print control device for controlling a printer, in a data transmission mode of the computer, the print data transmitting device comprises: (a) print data classifying means for classifying the print data into a plurality of sets of image data, and a plurality of sets of attribute data which accompany the sets of image data, respectively; (b) image data selecting means for selecting each of the sets of image data as an original set of image data included in the print data, or another set of image data stored in memory means, the data selecting means including the another set of image data in the print data as a new set of image data; (c) attribute data changing means for changing, if necessary, the set of attribute data which accompanies the original set of image data, on the basis of the new set of image data included in the print data by the image data selecting means; and (d) data transmitting means for transmitting to the print control device the print data including the new set of image data and the set of attribute data changed by the attribute data changing means.

The present device constructed according to the second aspect of the invention provides substantially the same advantages as the method according to the first aspect of the invention discussed above.

The third object indicated above may be accomplished according to a third aspect of this invention, which provides a method of transmitting print data from a computer to a print control device, in a data transmission mode of the computer, for controlling a printer, the method comprising: (a) a retrieving step of retrieving a file name of each of at least one set of direct image data stored in memory means, which file name is included in non-direct image data which are data other than the direct image data and which comprise print control data for controlling at least a printing operation according to the direct image data, the print data comprising the direct image data and the non-direct image data; and (b) a transmitting step of retrieving from the memory means each of at least one set of direct image data, on the basis of the file name retrieved in the retrieving step, and transmitting to the print control device the above-indicated at least one set of direct image data and the non-direct image data such that the at least one set of direct image data and the non-direct image data are not interspersed with each other.

According to the present method described just above, each set of direct image data the file name of which is included in the print control data of the non-direct image data is retrieved from the memory means, and the retrieved set of direct image data is transmitted to the print control device, separately from the non-direct image data such that the direct image data and the non-direct image data are not interspersed with each other. The direct image data are image data such as bit map data which directly represent an image to be printed, while the non-direct image data are data other than the direct image data. The non-direct image data may comprise indirect image data as well as the print control data which may include the file name of any set of direct image data. The indirect image data are image data indirectly representing an image. The indirect image data may comprise character data representative of characters such as letters, symbols and numerals, and graphic data representative of graphic or pictorial representations.

In the present method wherein the print control device receives the direct image data and the non-direct image data as separate batches of data, the print control device does not have to examine the entire print data for interpreting the print control data included therein, but examines and interprets only the non-direct image data which include the print control data and which may include indirect image data. Since the non-direct image data do not include the direct image data such as bit map data whose volume is generally comparatively large, the volume of the non-direct image data is comparatively small. Accordingly, the present method permits efficient processing of the print data by the print control device, and reduction of the time required for transmission of the print data from the computer to the print control device, owing to the reduced processing time required on the side of the print control device.

The print control data included in the non-direct image data may comprise attribute data as described above with respect to the first aspect of the invention.

The fourth object indicated above may be accomplished according to the fourth aspect of this invention, which provides a print data transmitting device for transmitting print data from a computer to a print control device, in a data transmission mode of the computer, for controlling a printer, the print data transmitting device comprising: (a) file name retrieving means for retrieving each file name of direct image data stored in memory means, which file name is included in non-direct image data which are data other than the direct image data and which comprise print control data for controlling at least a printing operation according to the direct image data, the print data comprising the direct image data and the non-direct image data; and (b) data transmitting means for retrieving from the memory means the direct image data, on the basis of each file name retrieved by the file name retrieving means, and transmitting to the print control device the direct image data and the non-direct image data such that the direct image data and the non-direct image data are not interspersed with each other.

The print data transmitting device constructed as described above according to the fourth aspect of the invention offers substantially the same advantages as the method according to the third aspect of the invention discussed above.

The fifth object indicated above may be attained according to a fifth aspect of the present invention, which provides a print control device interposed between a computer and a printer, for processing print data received from the printer so that the processed print data is available on the printer, the print control device comprising: (a) a first interface circuit for receiving the print data from the computer; (b) memory means for storing the print data received by the first interface circuit, the print data comprising first direct image data, and non-direct image data which are data other than the first direct image data and which comprise print control data for controlling at least a printing operation according to the first direct image data; (c) data storage controlling means for separately storing in the memory means the first direct image data as a direct image data file, and the non-direct image data as a non-direct image data file; (d) data converting means for interpreting the non-direct image data of the non-direct image data file stored in the memory means, and converting, when the non-direct image data include indirect image data, the indirect image data into second direct image data; (e) data synthesizing means for synthesizing the second direct image data obtained by the data converting means, and the first direct image data stored in the memory means; and (f) a second interface circuit for transmitting to the printer the first and second direct image data as synthesized by the data synthesizing means.

In the present print control device, the memory means stores the print data which are received from the computer through the first interface circuit, and which comprise first direct image data such as bit map data, and further comprise non-direct image data which are data other than the first direct image data and which comprise print control data for controlling at least a printing operation according to the first direct image data. The data storage controlling means is adapted to store the first direct image data and the non-direct image data as a direct image data file and a non-direct image data file, respectively, in the memory means. If any indirect image data such as graphic data or character data are included in the non-direct image data, the indirect image data are converted into second direct image data such as bit map data. The first and second direct image data are synthesized by the data synthesizing means, and are transmitted to the printer through the second interface circuit.

The provision of the data storage controlling means for separately storing in the memory means the first direct image data and the non-direct image data received from the computer permits the data converting means to examine and interpret only the non-direct image data, rather than the entire volume of print data received from the computer. The indirect image data if included in the print control data of the non-direct image data are converted into second direct image data, and are combined with the first direct image data by the data synthesizing means. Accordingly, the present method permits efficient processing of the received print data, and assures high-speed printing with high resolution of reproduced images, according to the first and second direct image data such as bit map data.

The memory means may comprise an external memory, and the print control device may further comprise a dynamic memory having a smaller data storage capacity than the external memory, and a direct memory access circuit for direct data transmission among the first and second interface circuits, the dynamic memory and the external memory.

In one advantageous form of the invention according to the fifth aspect of the invention described above, the print control device further comprises: a dual port memory having two ports so that each of memory cells of the dual port memory are accessible through the two ports; a first processing unit connected to one of the two ports of the dual port memory, for controlling data transmission among the dual port memory, the memory means and the second interface circuit; and a second processing unit which is connected to the other of the two ports of the dual port memory and which functions as the data converting means and the data synthesizing means.

According to a further aspect of this invention, there is provided a method of processing print data received from a computer so that the processed print data is available on a printer, the method comprising: (a) a storing step of storing in memory means the print data received from the computer, such that first direct image data included in the print data are stored as a direct image data file, while non-direct image data included in the print data are stored as a non-direct image data file, the non-direct image data being data other than the first direct image data and comprising indirect image data and print control data for controlling at least a printing operation according to the first direct image data; (b) a converting step of interpreting the non-direct image data of the non-direct image data file stored in the memory means, and converting the indirect image data into second direct image data; and (c) a synthesizing step of synthesizing the second direct image data obtained by the data converting means, and the first direct image data stored in the memory means; and (d) a transmitting step of transmitting to the printer the first and second direct image data as synthesized in the step of synthesizing the second and first direct image data.

The above method has substantially the same advantages as the device constructed according to the fifth aspect of the invention described above.

BRIEF DESCRIPTION OF TEE DRAWINGS

The above and optional objects, features, advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
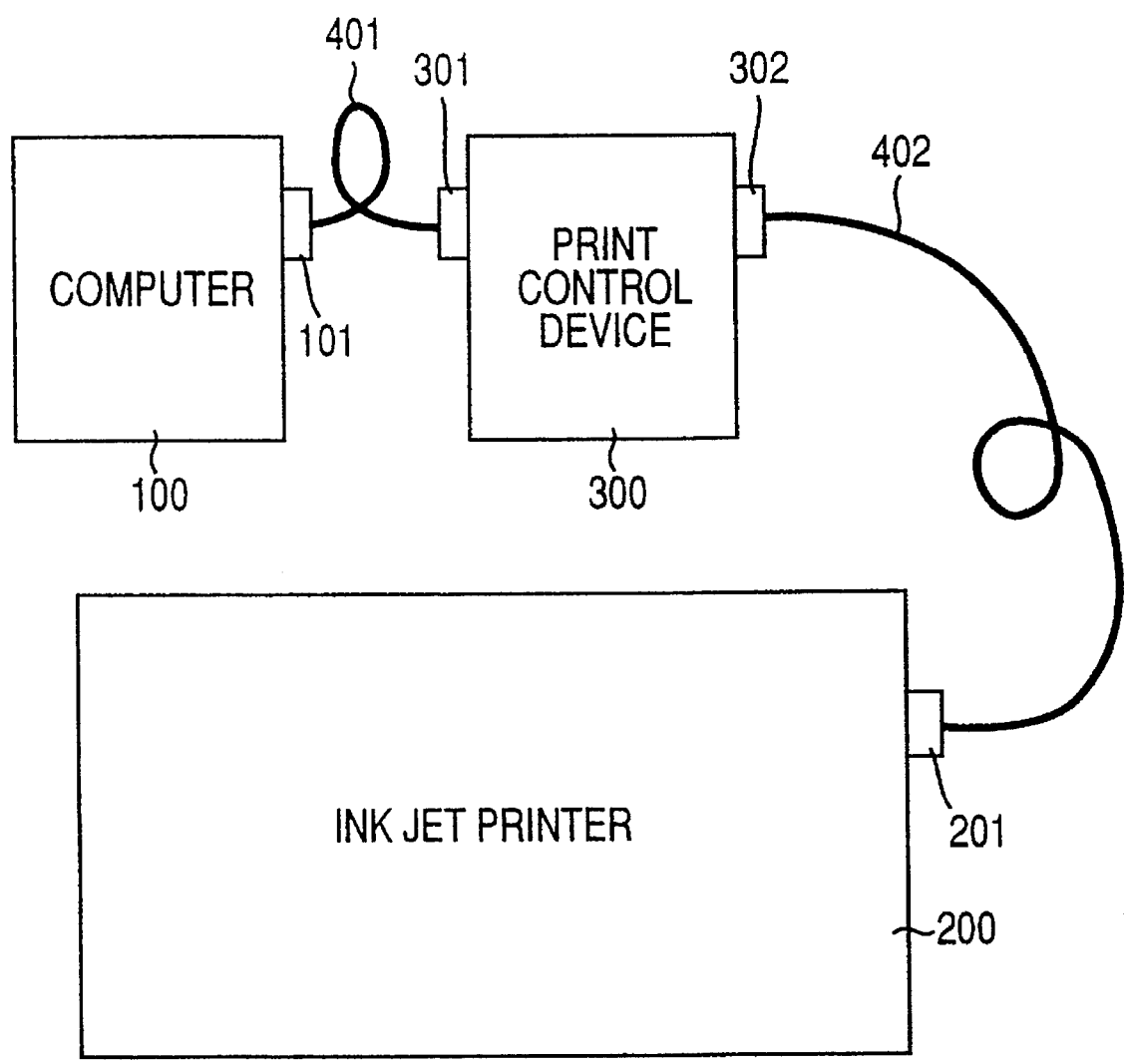
FIG. 1 is a view illustrating a printing system to which the present invention is applicable and which includes a computer, an ink jet printer, and a print control device that processes print data received from the computer and provides the printer with the processed print data.

Referring first to FIG. 1, the printing system shown therein includes a computer 100 which generates print data, a printer in the form of an ink jet printer 200, and a print control device 300 interposed between the computer 100 and the printer 200. The computer 100 takes the form of a word processor or a personal computer, for example. The computer 100 has a connector 101 which is connected to a first interface connector 301 of the print control device 300 by a first cable 401. The printer 200 has a connector 201 which is connected to a second interface connector 301 of the print control device 300.

Figure 2:
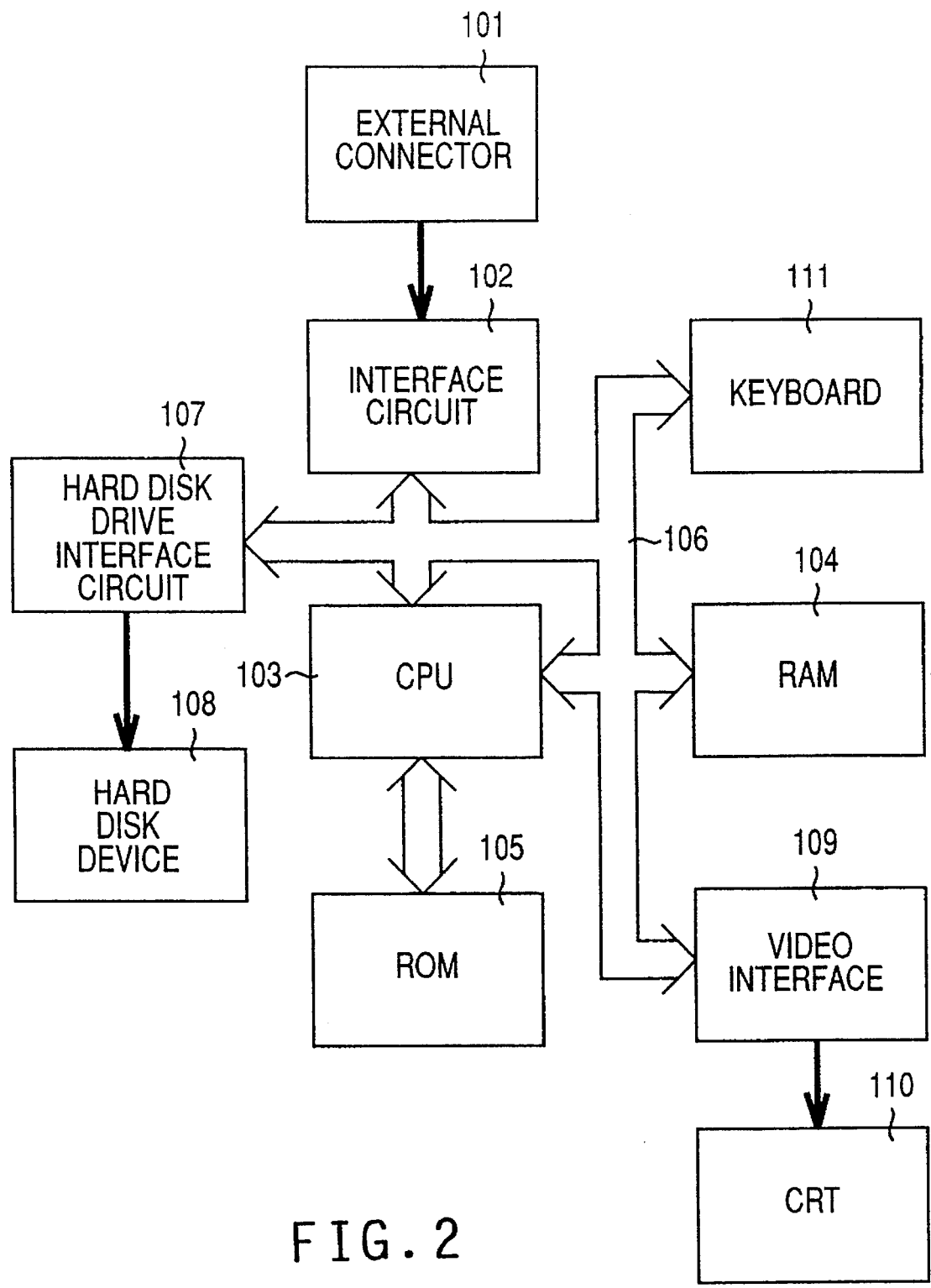
FIG. 2 is a block diagram schematically showing an arrangement of the computer.

As shown in FIG. 2, the computer 100 has an interface circuit 102 connected to the connector 101 and a bus 106. The computer has a central processing unit (CPU) 103, a random-access memory (RAM) 104, a hard disk drive interface circuit 107, a video interface 109, and a keyboard 111, which are interconnected with each other by the bus 106. The RAM 104 is provided to temporarily store various kinds of data used by the CPU 103. To the CPU 103, there is connected a read-only memory 105 which stores various control programs such as a program illustrated in the flow chart of FIG. 8, for processing print data and transmitting the processed print data to the print control device 300.

The interface circuit 107 is connected to a hard disk device 108 which functions to store print data, so that desired print data are sequentially transmitted to the print control device 300 through the interface circuit 102 and the connector 101, under the control of the CPU 103. The keyboard 111 is used to enter various data such as character codes as one kind of image data, and codes to specify file names of the image data stored in the hard disk device 108, for example. The video interface 109 is connected to a cathode ray tube (CRT) 110.

The print data include image data relating to images to be printed by the printer 200, and print control data used to control printing operations on the basis of the image data. The image data are classified into direct image data and indirect image data. The direct image data directly represent images to be printed, and generally takes the form of bit map data, which are generated on the basis of an output of an image scanner, for example. The direct image data may be such data as obtained by compression of the bit map data. Such compressed direct image data may include run-length codes, for instance. The indirect image data indirectly represent images, and are used to generate the data which are directly used for printing. The indirect image data include character data or codes representative of characters such as letters, symbols and numerals, and graphic data representative of graphic or pictorial representations including straight and curved lines. The character data and graphic data may be called "EPS (Encapsulated Postscript) data".

On the other hand, the print control data include attribute data and print control instruction data for controlling the print control device 300. Each set of image data is accompanied by a set of attribute data, which precedes the image data set. The attribute data include: image position data representative of the position at which an image represented by the corresponding image data set is printed; image size data representative of the size of the image; image color data representative of the color of the image; image rotation data representative of the angular attitude of the image; window data representative of a window associated with the image; and file name data indicative of the name of a file of the corresponding set of image data. The print control instruction data include various print control commands or instructions, which usually follow a batch of image data and attribute data.

Figure 3:
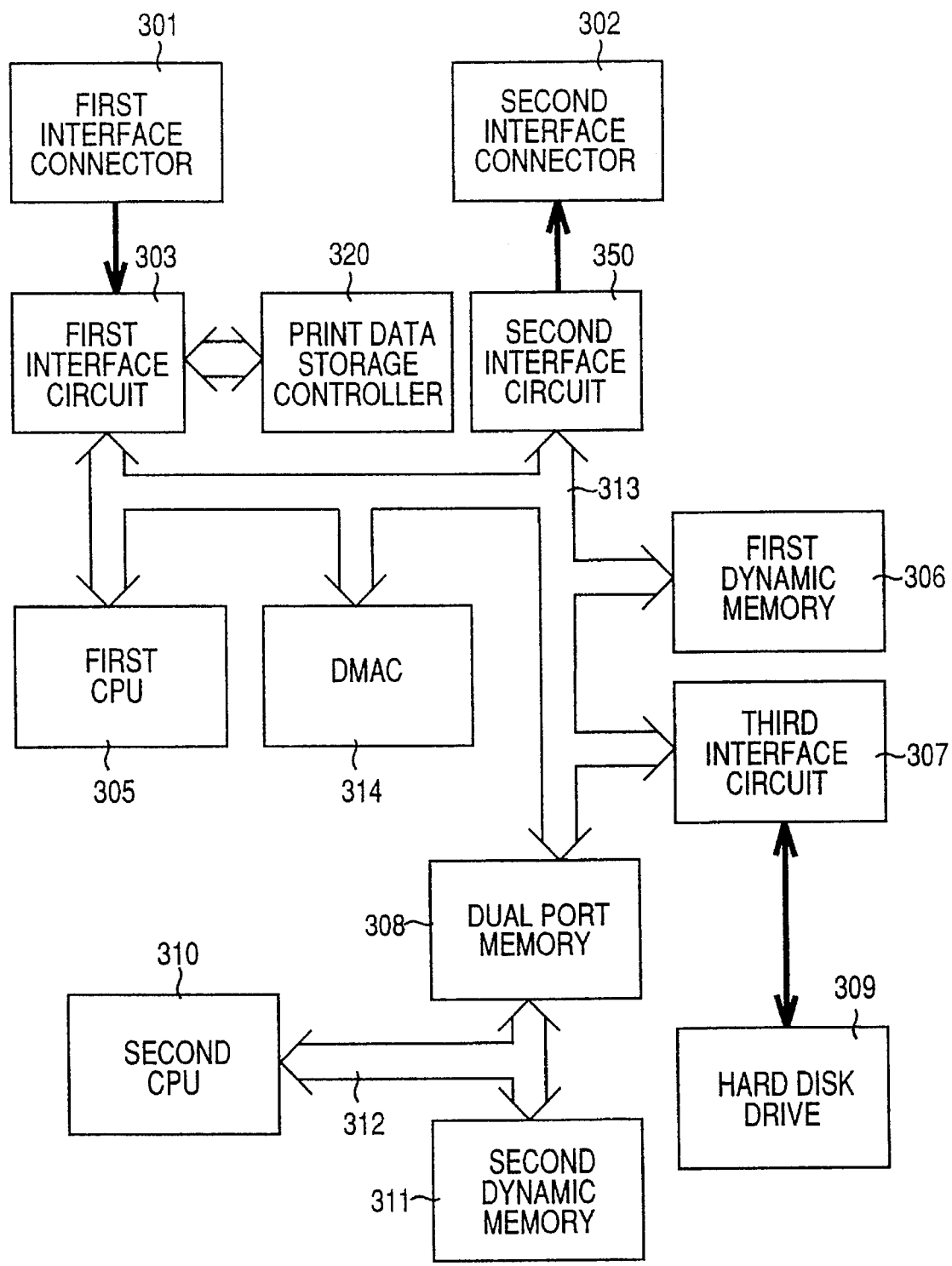
FIG. 3 is a block diagram schematically showing an arrangement of the print control device.

The computer 100 constructed as described above is connected through the first cable 401 to the first interface connector 301 of the print control device 300, which in turn is connected at its second interface connector 302 to the printer 200, as described above by reference to FIG. 1. Reference is now made to the block diagram of FIG. 3, to describe the arrangement of the print control device 300.

The first interface connector 301 is connected to a first interface circuit 303, which is connected to a print data storage controller 320 for controlling an operation to store the print data received from the computer 100 into a hard disk drive 309. The second interface connector 302 is connected to a second interface circuit 350. The first and second interface circuits 303, 350 are connected to a first central processing unit (CPU) 305 through a bus 313.

The bus 313 is also connected to a first dynamic memory 306, a third interface circuit 307, a dual port memory 308, and a dynamic memory access controller (DMAC) 314. The third interface circuit 307 is connected to the hard disk drive 309. This hard disk drive 309 stores programs for interpreting the print control instructions, and programs for converting the image data eventually into raster image data as described below. The dual port memory 308 has two ports one of which is connected to the bus 313, and the other of which is connected to a second central processing unit (CPU) 310 and a second dynamic memory 311 through another bus 312. It is noted that address buses and various control signals used in the print control device 300 are not shown, in the interest of simplification and brevity.

Figure 4:
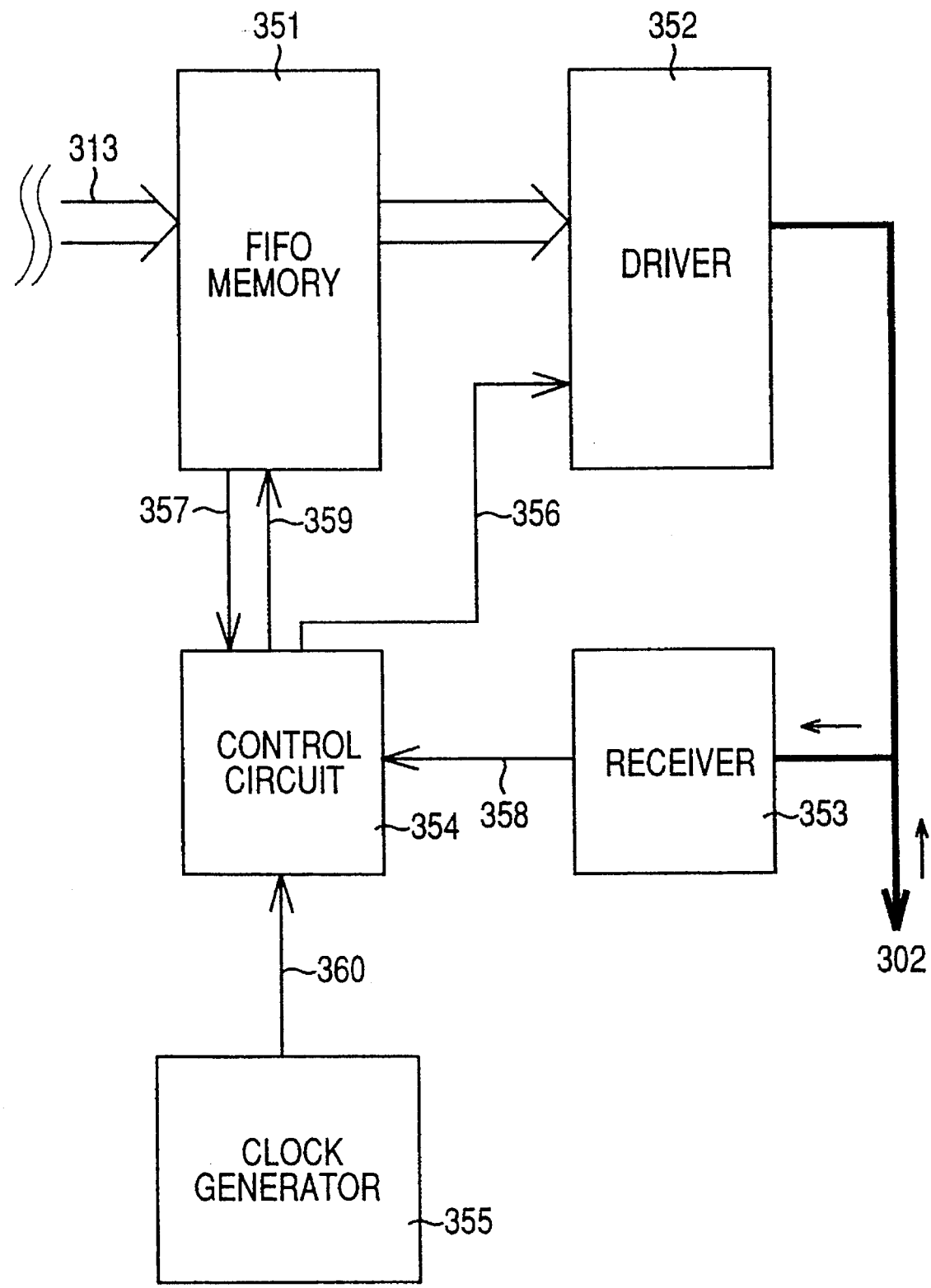
FIG. 4 is a block diagram schematically showing an arrangement of a second interface circuit of the print control device.

The second interface circuit 350 is shown in detail in the block diagram of FIG. 4. This interface circuit 350 includes a first-in first-out memory (FIFO) 351 which is connected at its input to the bus 313. The output of the FIFO 351 is connected to a driver 352, which in turn is connected to the second interface connector 302. The second interface circuit 350 further includes a receiver 353 which is connected to the second interface connector 302 to receive a READY signal therefrom. The READY signal received by the receiver 353 is sent to a control circuit 354, as indicated at 358. The control circuit 354 is connected to the driver 352 and the FIFO 351, so that a DATA CLOCK signal 356 and a READ signal 359 are fed from the circuit 354 to the driver 352 and the FIFO 351, respectively, and so that an EMPTY flag 357 is fed from the FIFO 351 to the control circuit 354. For the control circuit 354 to generate the DATA CLOCK signal 356 and the READ signal 359, the control circuit 354 receives a CLOCK signal 360 from a clock generator 355.

The second interface connector 302 of the print control device 300 is connected through the second cable 402 (FIG. 1) to the interface connector 201 of the ink jet printer 200, as described above. The printer 200 will be described in detail by reference to the block diagram of FIGS. 5 and 6.

Figure 5:
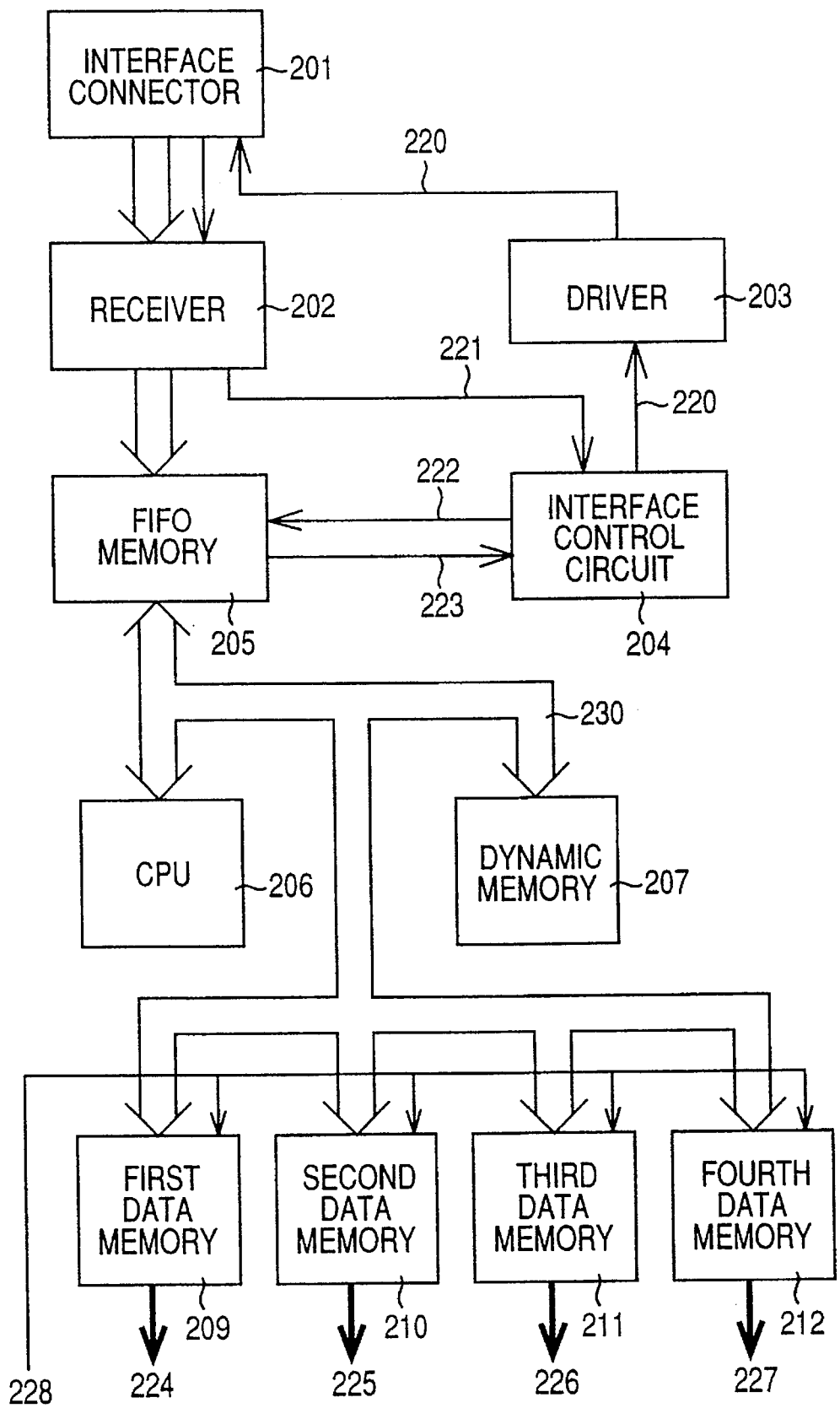
FIGS. 5 and 6 are block diagrams schematically showing an arrangement of the ink jet printer.

The interface connector 201 is connected to a receiver 202 and a driver 203, as shown in FIG. 5. The receiver 202 receives raster image data (described later) which are received from the print control device 300 through the interface connector 201 The driver 203 is connected to an interface control circuit 204, so that a READY signal 220 generated by the interface control circuit 204 is sent to the interface connector 201 through the driver 203. The receiver 202 is connected to the interface control circuit 204 and a first-in first-out memory (FIFO) 205, so that a DATA CLOCK signal 221 from the interface connector 201 is sent to the interface control circuit 204 through the receiver 202, and so that the raster image data is sent to the FIFO 205 through the receiver 202. The FIFO 205 is connected to the interface control circuit 204, so that a WRITE signal 222 generated by the interface control circuit 204 is sent to the FIFO 205, while a FULL flag 223 generated by the FIFO 205 is sent to the circuit 204. The FULL flag 223 indicates that the FIFO 205 is full of the data received from the receiver 202 in response to the WRITE signal 222.

Figure 6:
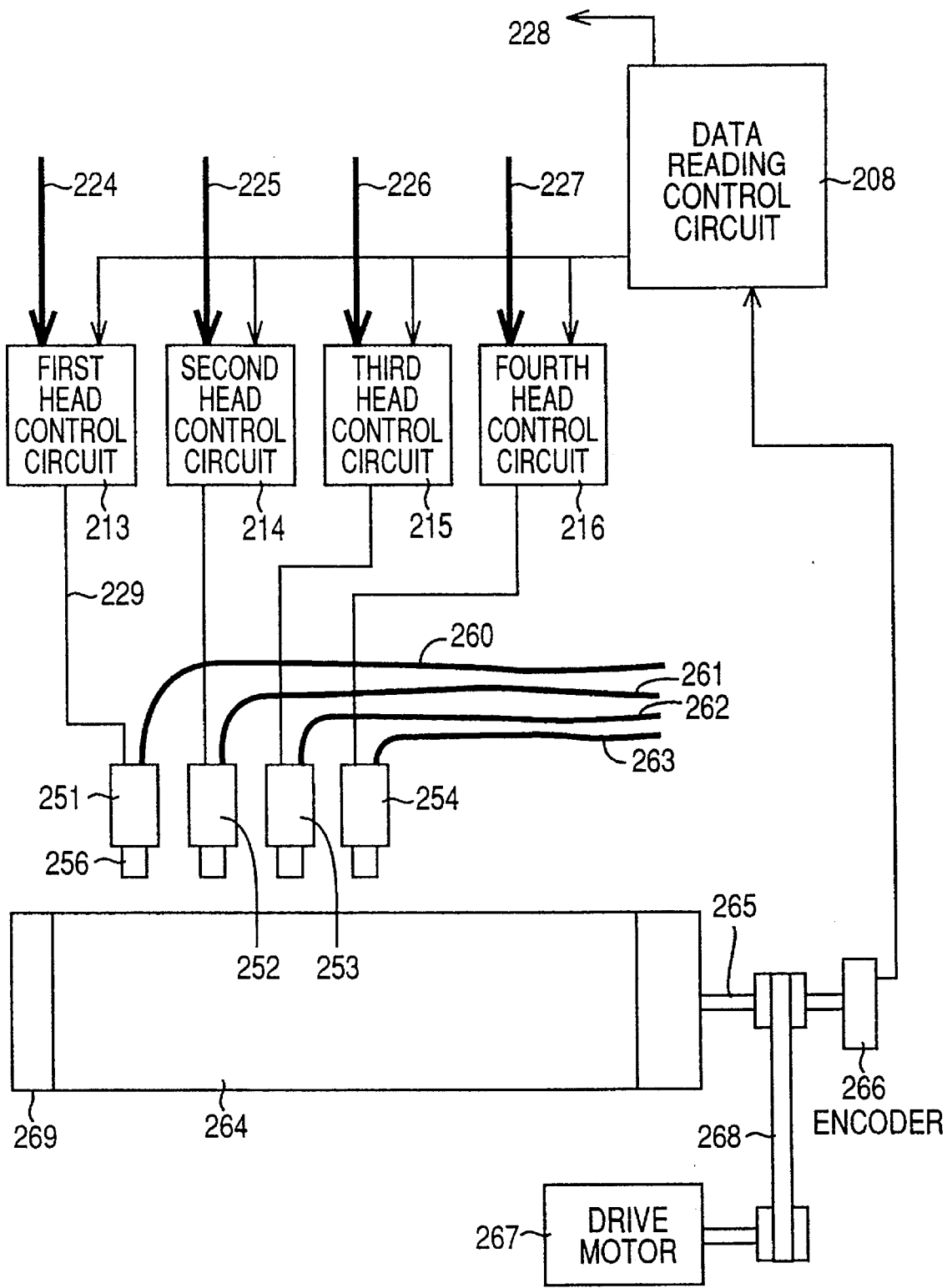

The ink jet printer 200 uses a central processing unit (CPU) 206 connected to an output of the FIFO 205 through a bus 230. The CPU 206 is also connected to a dynamic memory 207 and four data memories 209–212. These data memories 209–212 correspond to four different colors. That is, the data memories 209–212 are connected to four head control circuits 213–216 through respective lines 224–227, as shown in FIG. 6. The four head control circuits 213–216 are connected to respective ink jet heads 251–254 each having a single ink jetting nozzle 256. The ink jet heads 251–254 are provided with ink supply conduits 260–263 connected to respective ink reservoirs. The ink jet heads 251–254 receive HEAD CONTROL signals generated from the respective head control circuits 213–216, so that the delivery of the ink from the nozzles 256 are controlled according to the raster image data received from the print control device 300. For instance, the ink supply conduits 260–263 are connected to reservoirs of black, yellow, magenta and cyan inks.

The four ink jet heads 251–254 are spaced from each other by a predetermined distance along a platen 269 which supports a recording medium 264 such as a sheet of paper. The platen 269 is connected to a drive shaft 265, which in turn is connected a drive motor 267 by a belt 268, so that the platen 269 coaxial with the drive shaft 265 is rotated about its axis. A rotary encoder 266 is attached to the end of the drive shaft 265, so that a timing signal generated by the encoder 266 is applied to a data reading control circuit 208, which applies a READ signal 228 to the data memories 209–212, as indicated in FIGS. 5 and 6. The four ink jet heads 251–254 are fixed to a suitable carriage so that the four heads 251–254 are movable as a unit in the axial direction of the platen 269.

Figure 7:
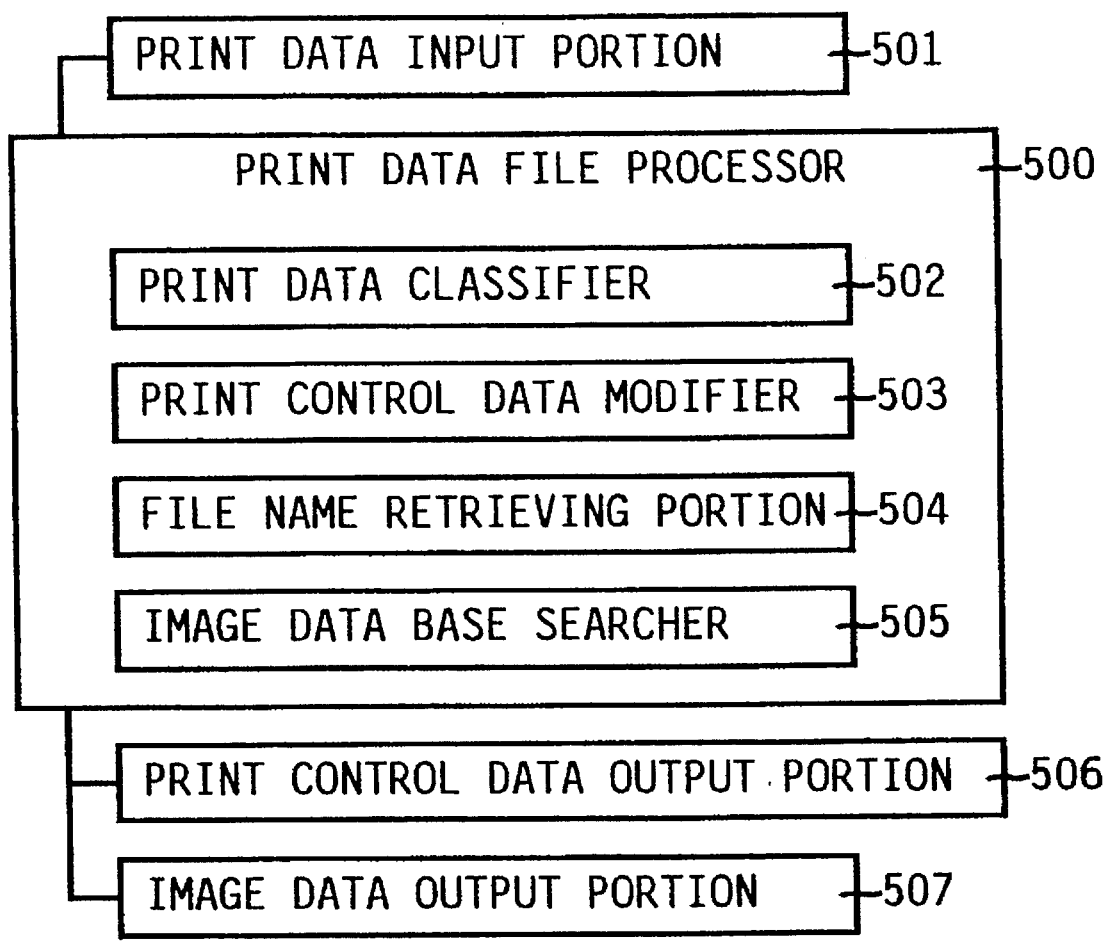
FIG. 7 is a block diagram schematically illustrating functional elements of the computer associated with one embodiment of the present invention.
Figure 8:
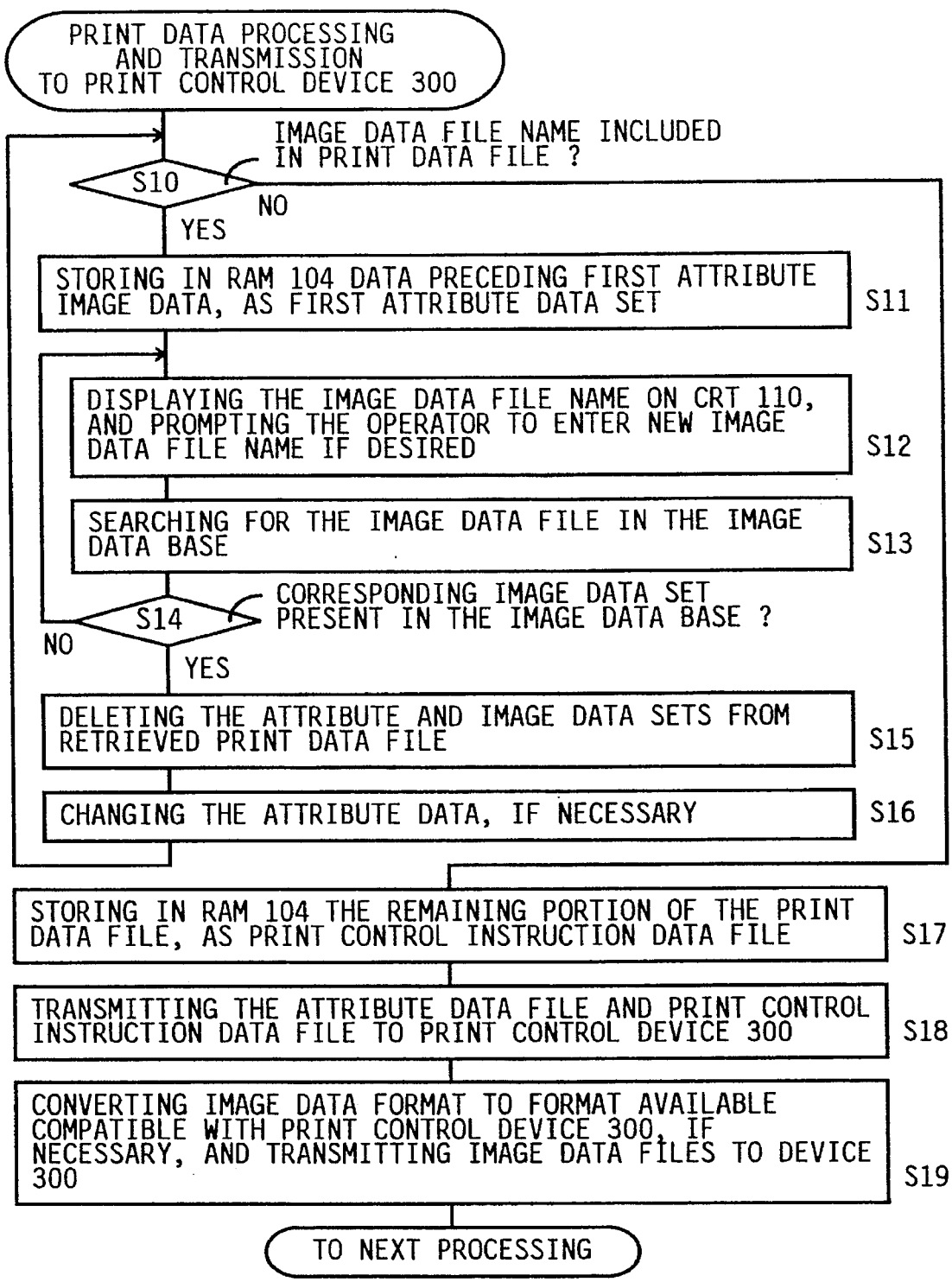
FIG. 8 is a flow chart illustrating a routine for processing print data and transmitting the processed print data to the print control device in the embodiment of FIG. 7.
Figure 9:
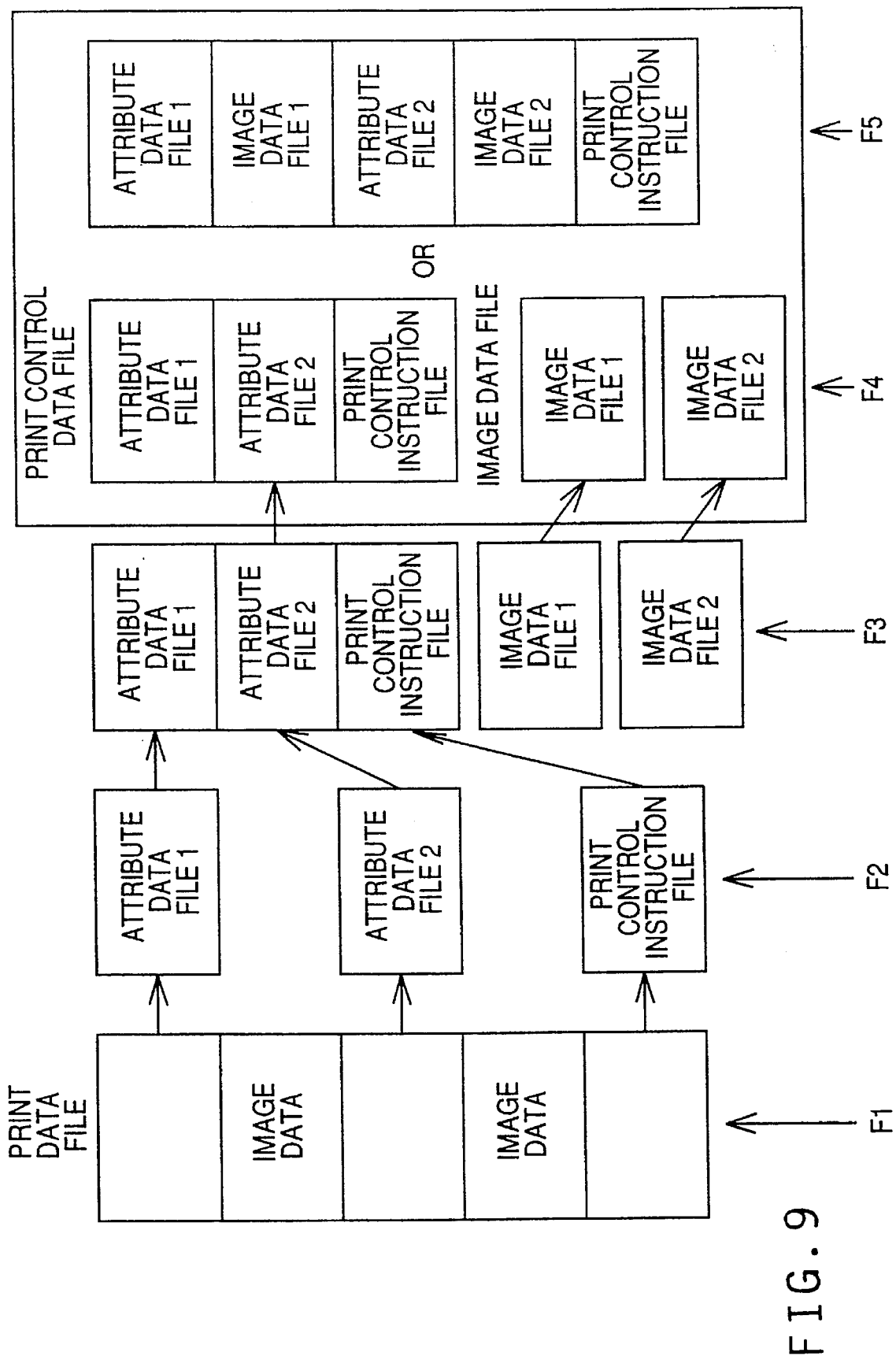
FIG. 9 is a view for explaining the process of print data file by the computer, illustrating different forms of print data as received by the print control device.
Figure 10:
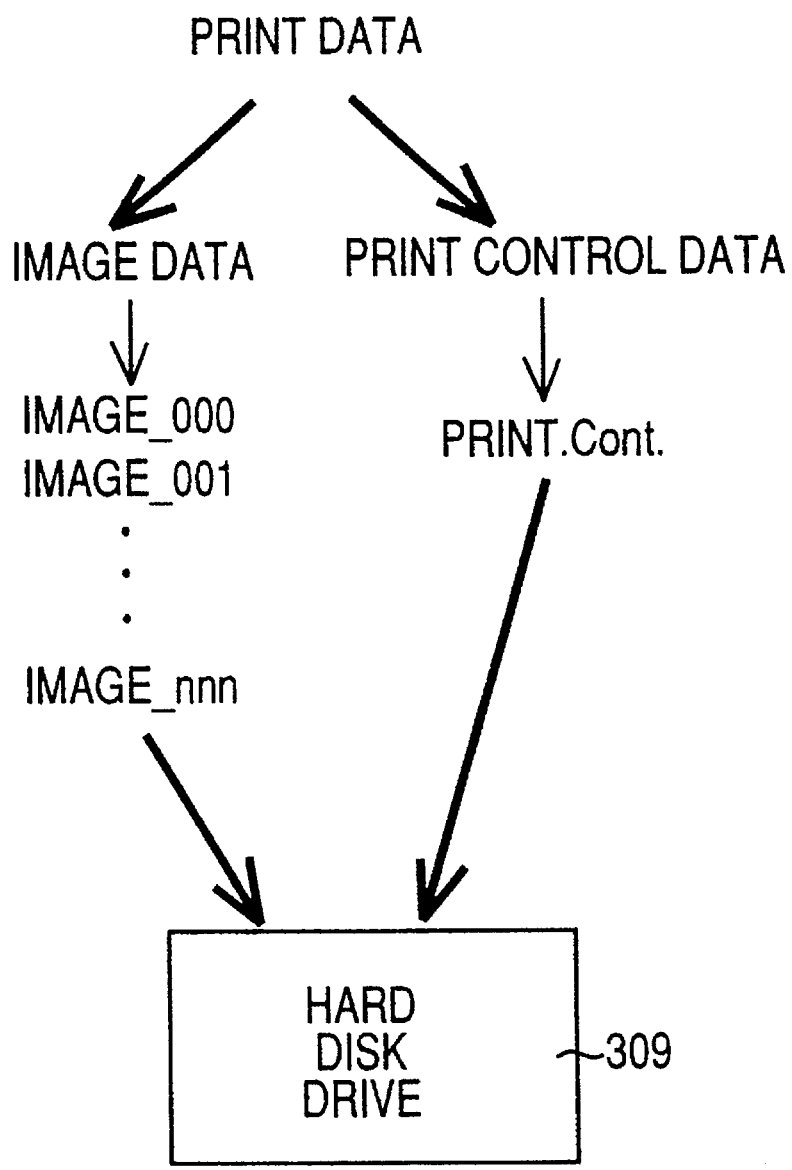
FIG. 10 is a view for explaining a print data storage controller of the print control device.
Figure 11:
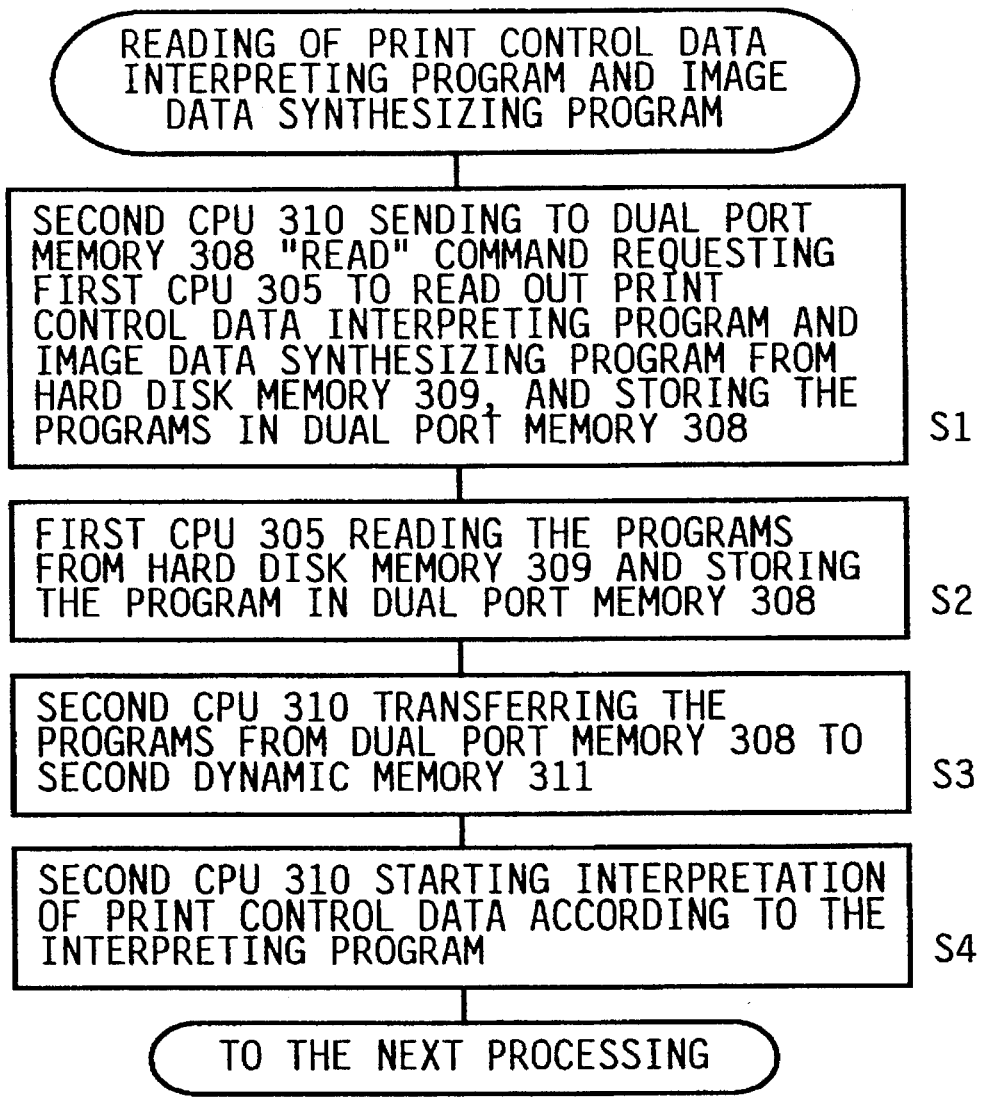
FIG. 11 is a flow chart illustrating a routine executed by the print control device for loading a dynamic memory of the print control device with a print control instruction interpreting program and an image data synthesizing program.
Figure 12:
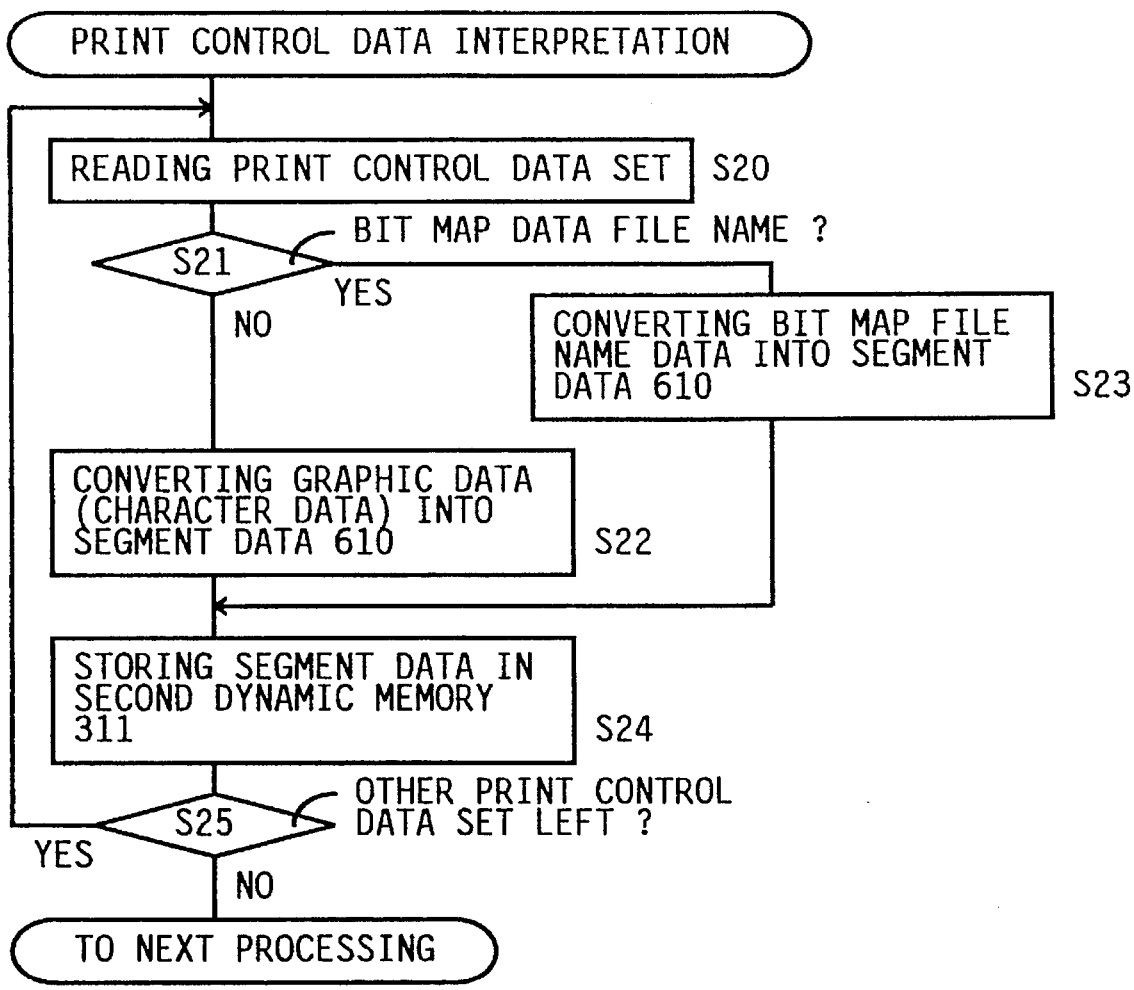
FIG. 12 is a flow chart illustrating a routine executed by the print control device for interpreting the print control instructions.

Referring next to FIGS. 7–9, there will be described the functions of the computer 100, which are performed by executing the routine of FIG. 8 the program of which is stored in the ROM 105. FIG. 7 indicates functional elements of the computer 100, which include a print data input portion 501, a print data file processor 500, a print control data output portion 506 and an image data output portion 507. The print data input portion 501 functions to read out or retrieve a batch of print data from the hard disk device 108, and the print data file processor 500 processes the retrieved print data, before the processed print data are transmitted to the print control device 300 through the output portions 506, 507, as described below in detail.

The print data file processor 500 includes a print data classifier 502, a print control data modifier 503, a file name retrieving portion 504, and an image data base searcher 505. The print data classifier 502 is provided to classify the print data into the image data, and the print control data which consist of the attribute data and the print control instructions, as described above. Each of two or more sets of image data of the print data is accompanied by a corresponding set of attribute data which represent the file name of the corresponding image data and also represent the position, size, color and attitude of the image represented by the corresponding image data set.

The print control data modifier 503 is provided to change the attribute data when the user of the printing system has replaced a certain set of image data in the original batch of print data in the data transmission mode of the computer 100, before the desired batch of print data is transmitted to the print control device 300. Described more specifically, when a set of image data is replaced by a new set of image data, it may be necessary to change the image position data and the image size data of the attribute data. For instance, where the resolution of the new set of image data is different from that of the original set of image data, the image position and size should be changed. Further, the attribute data should be changed if the type of the new set of image data is different from that of the original set of image data. For instance, the attribute data should be changed if a set of bit map data (direct image data) is replaced by a set of character data or graphic data (indirect image data or EPS data).

The file name retrieving portion 504 is adapted to retrieve file names included in the print control data of the print data file. The file names identify respective sets of image data of the print data. The retrieved file names are stored in the hard disk device 108 or RAM 104. The image data base searcher 505 operates to scan an image data base stored in the hard disk device 108, for searching for image data sets identified by the file names retrieved by the file name retrieving portion 504. The print control data output portion 506 and the image data output portion 507 function to transmit the print control data and the image data to the print control device 300, in the forms that can be understood by the print control device 300.

The functional elements 501–507 of the computer 100 cooperate to execute the routine illustrated in FIG. 8 while the computer 100 is placed in its data transmission mode. The routine is initiated with step S10 wherein the print data classifier 502 first determines whether any set of image data is included in the print data file (indicated at F1 in FIG. 9) retrieved from the hard disk memory 108 by the print data input portion 501. This determination is accomplished by checking if the file name of any set of image data is included in the print control data of the print data.

If the first set of image data is detected by finding the corresponding file name included in the first set of attribute data, the control flow goes to step S11 in which the initial portion of the print data which precedes the detected first set of image data is stored in the RAM 104 as a first attribute data file 1, as indicated at F2 in FIG. 9. Step S11 is followed by step S12 in which the file name retrieving portion 504 displays the file name of the first set of image data on the CRT 110. That is, the file name included in the first attribute data file 1 preceding the first set of image data is displayed on the CRT 110. At this time, the CRT 110 also provides a message prompting the operator of the computer 100 to either confirm that the first set of image data identified by the file name displayed should be included in the print data file to be transmitted to the print control device 300, or operate the keyboard 111 to enter or specify the file name of a new set of image data which replaces the original set of image data whose file name is displayed on the CRT 110.

Then, the control flow goes to steps S13 and S14 in which the image data base searcher 505 scans the image data base to search for the set of image data whose file name is displayed on the CRT 110 or entered through the keyboard 111. If the corresponding set of image data is found in the image data base, step S14 is followed by step S15. If the corresponding set of image data is not found, the control flow goes back to step S12 in which the CRT 110 provides an indication that the image data set corresponding to to the file name in question is not stored in the hard disk device 108. In this case, the operator should specify the file name of another set of image data stored in the hard disk device 108.

If the image data set is found in the hard disk memory 108, step S15 is implemented to delete the first set of attribute data and the first set of image data set from the print data file as retrieved by the print data input portion 501. Then, step S16 is implemented to activate the print control data modifier 503 to change the attribute data file 1 temporarily stored in the RAM 104, if any change of this attribute data file 1 is necessary due to replacement in step S12 of the original set of image data by a new set of image data. Described more specifically, the resolution and size of the new set of image data are compared with those of the original set of image data, to determine whether the position data and size data of the attribute data should be changed to meet the format of the new set of image data, so that the image as printed on the basis of the new set of image data can be suitably located and sized.

Then, the control flow goes back to step S10 to determine whether the file name of another set of image data is present in the remaining portion of the retrieved print data file. Steps S11–S16 are implemented again for the second set of attribute data (second set of image data), so that the second attribute data file 2 is stored in the RAM 104, and this file 2 is changed as needed depending upon whether the original second set of image data is replaced by a new set of image data. Thus, steps S10–S16 are repeatedly implemented until the last set of attribute data is stored in the RAM 104. Thus, the batch of attribute data files including the file names of the image data sets is stored in the RAM 104, while the image data sets included in the print data file are stored in the hard disk device 108, whereby the print data file is classified into the attribute data sets and the image data sets.

If the file name of any image data set is not found in the print data file, namely, if steps S11–S16 have been implemented for all sets of attribute data and image data, a negative decision (NO) is obtained in step S10, and the control flow goes to step S17 in which the remaining portion of the print data file is stored in the RAM 104 as a print control instruction file, as indicated at F2 of FIG. 9. Step S17 is followed by step S18 in which the print control data output portion 506 arrange all the attribute data files and the print control instruction file as indicated at F3 in FIG. 9, and transmit these attribute data files and print control instruction file as a batch of print control data to the print control device 300, as indicated at F3 and F4 in FIG. 9.

Then, the control flow goes to step S19 in which the image data output portion 507 operates to check if the format of any set of image data should be changed to the format compatible with the print control device 300. In step S19, the format is changed if necessary for any sets of image data. For instance, if the print control device 300 is adapted to use an interleaved format, the image data sets of non-interleaved format should be changed to the interleaved format. Then, the image data files are transmitted to the print control device 300 as a batch of image data, as indicated at F3 and F4.

As indicated above, the print data file as retrieved by the print data input portion 501 includes two or more sets of image data each preceded by a set of attribute data, as indicated at F1 in FIG. 9. Each set of attribute data includes the file name of the following set of image data. The attribute data and the print control instruction data are retrieved from the print data file, as indicated at F2, and stored in the RAM 104 as attribute data files and print control instruction file as indicated at F3. Further, the file name of any set of image data can be changed as desired in step S12, and the new file name is included in the appropriate attribute data file temporarily stored in the RAM 104. If necessary, the attribute data files for the new sets of image data are changed by the print control data modifier 503. The image data sets corresponding to the file names included in the attribute data files are retrieved from the hard disk device 108, and transmitted to the print control device 300, separately from the print control data, as indicated at F3 and F4. It is noted that F4 indicates a batch of print data as received by the print control device 300. Thus, the batch of image data and the batch of print control data are transmitted to the print control device 300 in a separate transmission mode such that the sets of image data are not interspersed with the sets of attribute data and print control instruction data.

The file names included in the print control data represent the file names of direct image data such as bit map data, or the file names of indirect image data such as character code data and graphic data. Accordingly, the image data received by the print control device 300 may include such bit map data, character code data and graphic data, alone or in combination.

Referring further to FIGS. 10–14, there will be described operations of the print control device 300 and the ink jet printer 200.

When the batch of print control data and the batch of image data from the computer 100 are received by the first interface circuit 303 of the print control device, the first CPU 305 activates the print data storage controller 320, which recognizes the first received batch as print control data PRINT.Con., and the secondly received batch as image data IMAGE. These print control data PRINT.Con and the image data IMAGE are stored in the hard disk drive 309. The sets of image data are sequentially written in the hard disk drive 309 as IMAGE__000, IMAGE__001, . . . IMAGE__nnn.

Since the image data IMAGE are merely transferred to the hard disk drive 309 without interpretation thereof, the image data IMAGE can be stored in the hard disk drive 309 in a relatively short time, even when the volume of the image data is considerable. Accordingly, the computer 100 is freed from the data transmission in a relatively short time. Further, since the entire batch of print data are stored in the hard disk drive 309, the capacity of the first dynamic memory 306 used to store the raster image data as described below can be reduced.

After the entire print data have been stored in the hard disk drive 309, the first CPU 305 sends to the dual port memory 308 a command requesting the second CPU 310 to interpret the print control data. In response to this command received from the dual port memory 308, the second CPU 310 sends to the dual port memory 309 a command requesting the first CPU 305 to retrieve the print control data from the hard disk drive 309 and store the print control data in the dual port memory 308. In response to this command, the first CPU 305 stores the print control data in the dual port memory 308. Then, the second CPU 310 starts an operation to interpret the print control data, and stores in the second dynamic memory 311 data obtained as a result of the interpretation of the print control data.

The hard disk drive 309 stores the programs for interpreting the print control data, and programs for converting the image data eventually into raster image data, as indicated above. These programs are written in the dual port memory 308 according to a routine illustrated in FIG. 11. Initially, the routine is initiated with step S1 wherein the second CPU 310 sends to the dual port memory 308 a READ command requesting the first CPU 305 to retrieve the print control data interpreting program and image data synthesizing program from the hard disk drive 309 and store these programs in the dual port memory 308. Step S1 is followed by step S2 in which the first CPU 305 reads out the programs from the hard disk drive 309 and stores the programs in the dual port memory 308.

Then, the control flow goes to step S3 in which the second CPU 310 transfers the programs from the dual port memory 308 to the second dynamic memory 311. Step S3 is followed by step S4 in which the second CPU 310 starts interpreting the print control data according to the print control data interpreting program. The interpretation of the print control data by the print control device 300 will be described in detail, by reference to the flow chart of FIG. 12.

Initially, step S20 is implemented to read the first set of print control data, which is usually a set of attribute data. Then, step S21 is implemented to determine whether the print control data set represents the file name of any bit map data set which is received and stored in the hard disk drive 309. If a negative decision (NO) is obtained in step S22, this means that the print control data set represents the file name of a set of graphic data (or character data), and the control flow goes to step S22 in which the graphic data set is converted into segment data 610 as indicated in FIG. 13(b). If the print control data set represents the file name of any set of bit map data stored in the hard disk drive 309, step S21 is followed by step S23 in which the bit map data set is converted into segment data 610. Step S22 and S23 are followed by step S24 in which the segment data 610 are stored in the second dynamic memory 311. If the dynamic memory 311 is full, the segment data 610 may be temporarily stored in the hard disk drive 309. However, the hard disk drive 309 may be used to always store the segment data 610.

Then, the control flow goes to step S25 to determine whether any set of print control data is left. Steps S20–S25 are repeatedly implemented until the segment data 610 for all the file names included in the print control data are stored in the dynamic memory 311 or hard disk memory 309.

Figure 13A:
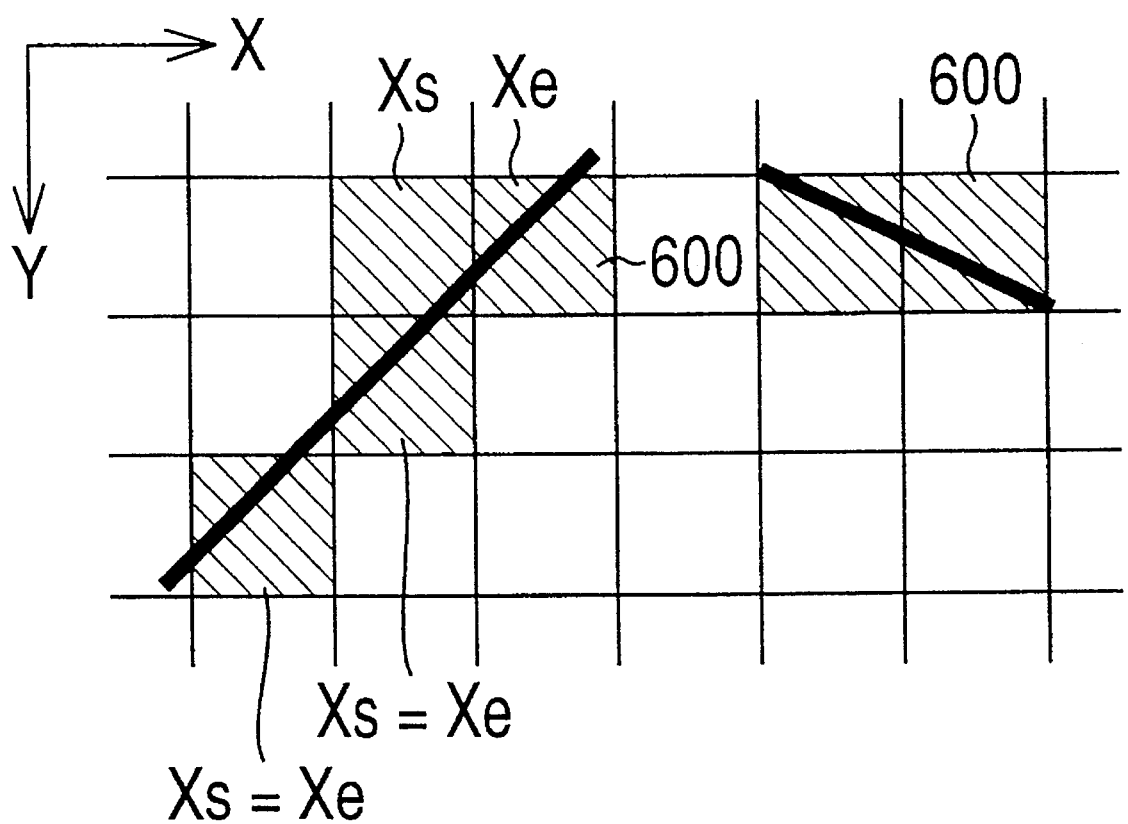
FIG. 13(a) is a view for explaining the conversion of a straight line of graphic data into segment data.
Figure 13B:
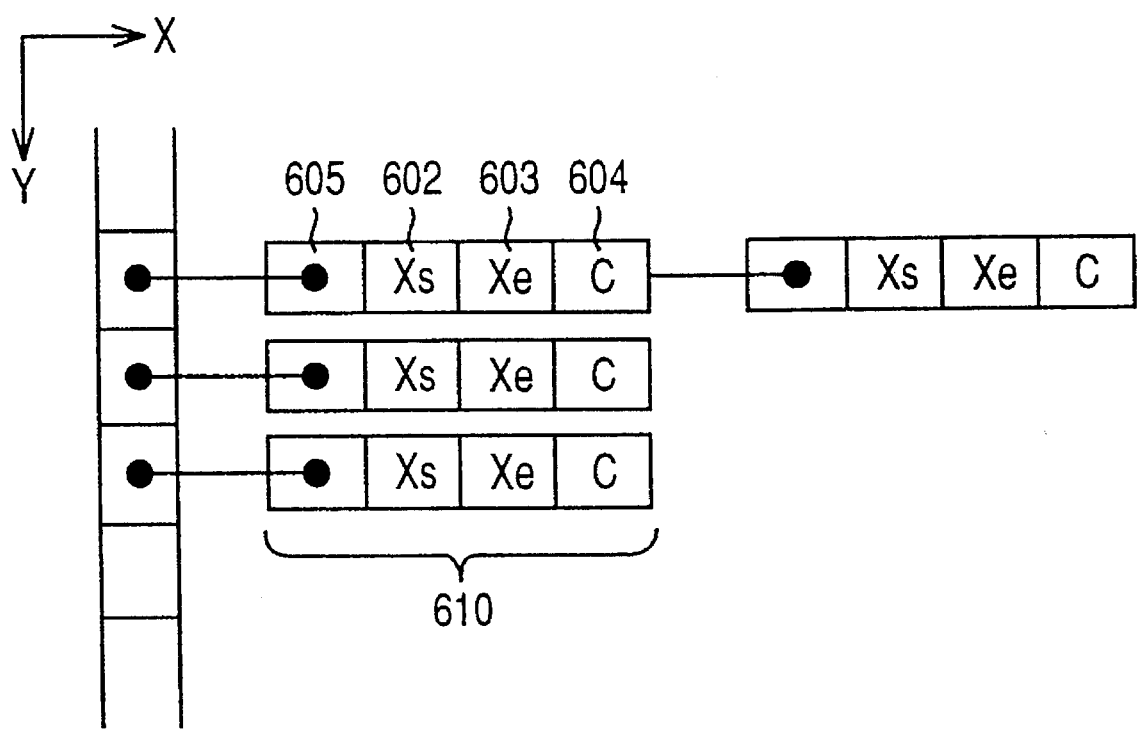
FIG. 13(b) is a view illustrating the segment data.

An example of the segment data 610 is illustrated in FIG. 13(b), which is obtained by converting a set of graphic data (non-direct image data) representative of two straight lines indicated in FIG. 13(a). The two straight lines are initially converted into X and Y coordinate values of picture elements whose areas are bisected by either one of the straight lines, as indicated by hatched areas in FIG. 13(a). The segment data 610 are defined in the X-Y coordinate system in which the Y axis corresponds to the axial direction of the platen 269 in which the ink jet heads 251–254 of the ink jet printer 200 are moved, while the X axis corresponds to the rotating direction of the platen 269, in which printing by each head 251–254 is effected as described below. Each set of segment data 610 obtained from graphic data as in the present example comprises segment start data 602 indicative of the beginning of a segment along the X-axis, segment end data 603 indicative of the end of the segment, color data 604 indicative of the color of the segment, and connection data 605 indicative of a pointer in the list. The segment data sets 610 may be sequentially added in the form of a list.

In the case that a set of segment data is obtained from bit map data (direct image data), the color data 604 are replaced by file name data 604 indicative of the file name of the bit map data, which file name is given by the print data storage controller 320. For instance, the color data 604 represent a color number selected from "0" through "255" while the file name data 604 represent a file name number which is "256" or larger. Since each set of segment data 610 obtained from graphic data comprises the color data 604 while each set of segment data 610 obtained from bit map data comprises file name data 604, it is possible to determine whether each set of segment data has been obtained from the graphic data or the bit map data.

If a negative decision (NO) is obtained in step S25, that is, if the segment data for the entire print data have been stored in the second dynamic memory 311, the control goes to the next processing operation in which the second CPU 310 first applies a print start command to the dual port memory 308. In response to the print start command received from the dual port memory 308, the first CPU 305 sends to the second interface circuit 350 a print start command to start the ink jet printer 200. In the meantime, the second CPU 310 starts to convert the segment data 610 stored in the second dynamic memory 311 into the corresponding raster image data, as described below. The raster image data are sent to the first-in first-out memory 351.

When the READY signal 358 is present, the control circuit 354 of the second interface circuit 350 applies the READ signal 359 to the first-in first-out memory FIFO 351 so that the print start command is fed to the driver 352, while the control circuit 354 applies the DATA CLOCK signal 356 to the driver 352, so that the driver 352 sends the print start command and the DATA CLOCK signal 356 to the receiver 202 of the printer 200. The receiver 202 sends the DATA CLOCK signal 221 to the interface control circuit 204, in synchronization with the DATA CLOCK signal 356, whereby the WRITE signal 222 is feed from the interface control circuit 204 to the first-in first-out memory FIFO 205, so that the print start command and the raster image data are received by the FIFO 205 in synchronization with the DATA CLOCK signal 356 (221). Thus, the print start command and print commands based on the the raster image data are sent one after another to the FIFO 205 of the printer 200, until the EMPTY flag signal 357 is generated from the FIFO 351 of the print control device 300, or until the FULL flag signal 223 is generated from the FIFO 205 of the printer 200.

The CPU 206 of the printer 200 sequentially reads out the print start command and print commands from the FIFO 205. When the print start command is received, the CPU 206 commands a driver circuit (not shown) to activate the motor 267 to rotate the platen 269 for rotating the recording medium 264 with the platen. In this respect, it is noted that printing is effected on the recording medium 264 while the platen 269 is continuously rotated and the print heads 251–254 are intermittently fed in the axial direction of the platen 269. Each time the platen 269 is rotated one full turn, the heads 251–254 are fed by a predetermined distance. The rotating direction of the platen 269 (recording medium 264) corresponds to the horizontal raster scan line (main scanning direction or X-axis direction) while the direction of movement of the heads 251–254 corresponds to the vertical raster scan line (auxiliary scanning direction or Y-axis direction). Generally, a sheet of paper as the recording medium is wound on the platen 269 such that the long sides of the sheet parallel to the vertical or Y-axis scanning direction is parallel to the axis of the platen 269 while the short sides parallel to the horizontal or X-axis scanning direction is parallel to the rotating direction of the platen. One horizontal raster scan line corresponds to one full rotation of the platen 269 and to the predetermined distance of intermittent movement of the heads 251–254. The number of rotations of the platen 269 corresponds to the number of the vertical raster scan lines. The printing is considered to take place in the rotating or circumferential direction of the platen 269.

Figure 14:
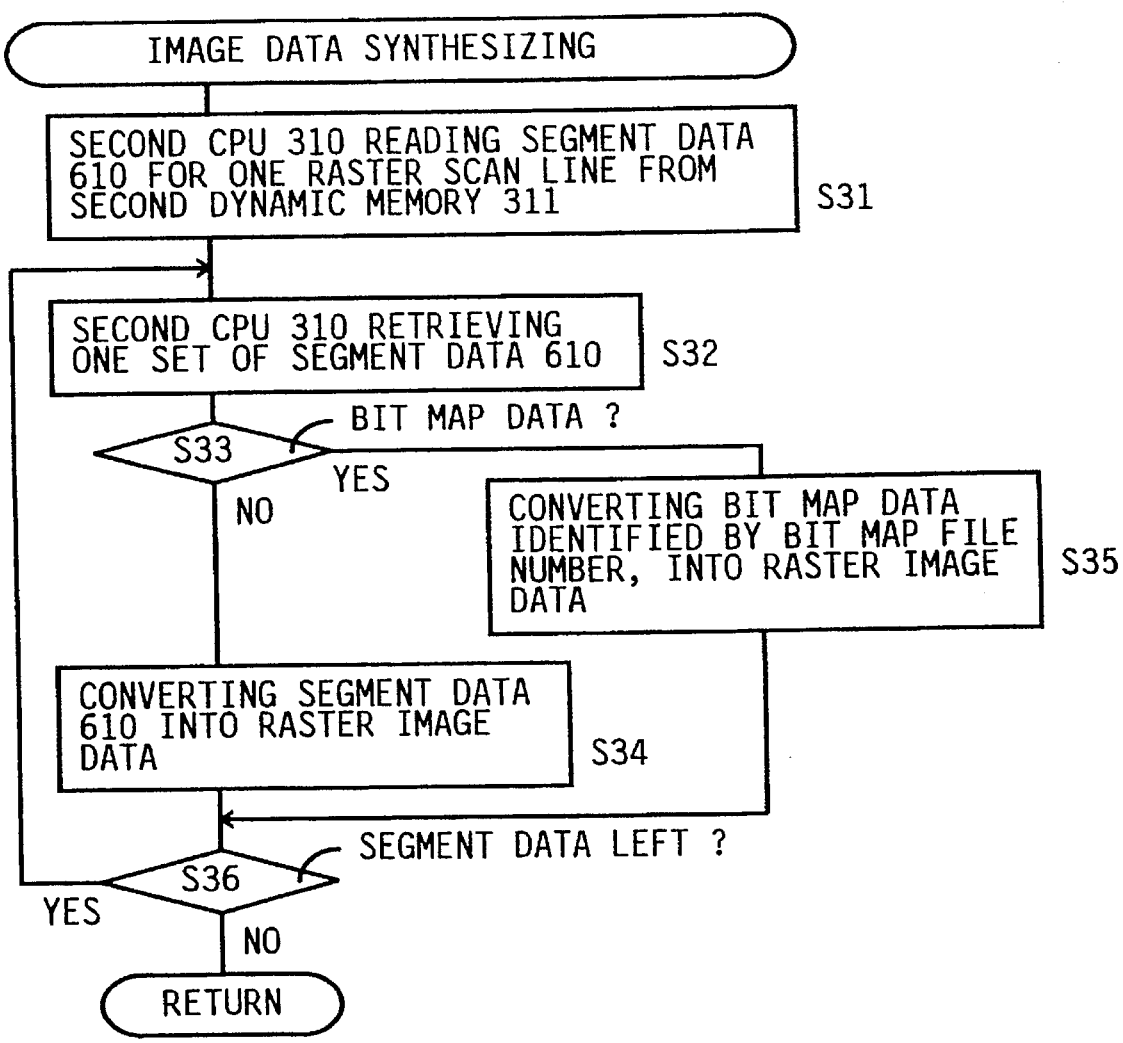
FIG. 14 is a flow chart illustrating a routine executed by the print control device for synthesizing different sets of image data.

Referring to the flow chart of FIG. 14, there will be described an operation of the second CPU 310 to convert the segment data into the raster image data. A routine illustrated in FIG. 14 is referred to as "image data synthesizing routine" since the routine is adapted to synthesize the segment data obtained from graphic data and the segment data obtained from bit map data, into raster image data representative of a combination of images originally represented by the graphic data and the bit map data, if the original print data consist of such graphic data and bit map data. The routine is initiated with step S31 in which the second CPU 310 reads out from the second dynamic memory 311 a group of segment data 610 corresponding to one horizontal raster scan line. The group of segment data 610 consists of one or more sets of segment data 610. Step S31 is followed by step S32 in which the second CPU 310 retrieves one set of segment data 610. Then, the control flow goes to step S33 to determine whether the set of segment data 610 in question has been obtained from graphic data (or character data) or bit map data. This determination is effected based on whether the segment data set comprises the color data 604 or the file name data 604. If the color data 604 are included in the segment data set 610, this means that the segment data set 610 has been obtained from a set of graphic data, and the control flow goes to step S34 in which the segment data set 610 is converted into a corresponding set of raster image data. If the file name data 604 are included in the segment data set 610, step S33 is followed by step S35 in which a set of raster image data is prepared based on the bit map data identified by the file name represented by the file name data 604. Steps S34 and S35 are followed by step S36 to determine whether the group of segment data 610 corresponding to one horizontal raster scan line includes another set of segment data 610. If an affirmative decision (YES) is obtained in step S36, the control flow goes back to step S32. Steps S32–S36 are repeatedly implemented until the raster image data have been obtained for the group of segment data retrieved in step S31. The routine of FIG. 14 is executed for all groups of segment data 610 corresponding to all the horizontal raster scan lines which cover the width of an image printed on the recording medium 264. That is, the routine is executed for each group of segment data 610 obtained from the entire print data received from the computer 100. The raster image data obtained in steps S34 and S35 for each horizontal scan line are temporarily stored in the dual port memory 308.

The first CPU 305 transfers a group of raster image data corresponding to one horizontal scan line, from the dual port memory 308 into the first dynamic memory 306, and commands the dynamic memory access controller DMAC 314 to write the group of raster image data in the FIFO 351 of the second interface circuit 350. Accordingly, the required storage capacity of the first dynamic memory 306 corresponds to one horizontal raster scan line. This required capacity is extremely smaller than that of a memory in a printing system wherein raster image data for an entire page are stored in the memory. When the FIFO 351 is full of the raster image data, the dynamic memory access controller 314 interrupts the transfer of the raster image data from the first dynamic memory 306 to the FIFO 351. When the EMPTY flag signal 357 is generated by the FIFO 351, the dynamic memory access controller 314 starts transferring the raster image data into the FIFO 351. While the transfer of the raster image data to the FIFO 351 is interrupted, the first CPU 305 can command the second CPU 310 to retrieve the next group of segment data 610 from the second dynamic memory 311, or can start transferring the next group of raster image data from the dual port memory 308 to an empty area of the first dynamic memory 306. It is noted that the second CPU 310 can continue to operate to convert the segment data (bit map data) into the raster image data, irrespective of whether the bus 313 is currently occupied or not.

As described above, the group of the raster image data is sent from the FIFO 351 to the FIFO 205 of the printer 200 after the print start command is applied to the FIFO 205. The CPU 206 temporarily stores the raster image data in the dynamic memory 207. Where the raster image data have been obtained from graphic data, that is, obtained from segment data 610 comprising the color data 604, each group of raster image data for the corresponding horiazontal raster scan line consists of four components corresponding to the cyan, magenta, yellow and black inks, that is, the four print heads 254, 253, 252 and 251. Initially, the CPU 206 applies the cyan component (cyan raster image data) to the fourth data memory 212, and commands the data reading control circuit 208 to start a printing operation by the cyan head 254 for the first horizontal raster scan line. As a result, the control circuit 208 transfers the cyan raster image data from the data memory 212 to the fourth head control circuit 216, in synchronization with the output signal of the rotary encoder 266.

The head control circuit 216 activates the cyan ink jet head 254 to jet a droplet of a cyan ink toward the recording medium 264 at selected picture element positions along the first horizontal raster scan line according to the cyan raster image data while the platen 269 is rotated one full turn. As a result, cyan ink dots are selectively produced along the appropriate horizontal raster scan line. Then, the print heads 251–254 are moved by the one-dot distance (corresponding to one horizontal raster scan line) in the axial direction of the platen 269, and cyan ink dots are selectively formed by the cyan head 254 along the second horizonal raster scan line according to the cyan raster image data for that scan line, during the next or second rotation of the platen 269. Simultaneously, that is, during the second rotation of the platen 269, the magenta head 253 is activated according to the magenta raster image data from the third head control circuit 215, whereby magenta ink dots are selectively formed along the first horizontal raster scan line.

Then, the print heads 251–254 are moved by another one-dot distance in the axial direction of the platen 269, whereby the cyan, magenta and yellow heads 254, 253, 252 are aligned with the third, second and first horizontal raster scan lines, respectively. These heads 254, 253, 252 are activated according to the respective cyan, magenta and yellow raster image data, whereby yellow ink dots are selectively formed along the first vertical scan line, while cyan and magenta ink dots are selectively formed along the third and second horizontal raster scan lines, respectively. Then, the print heads 251–254 are moved by another one-dot distance, whereby the black head 251 is aligned with the first horizontal raster scan line. The four heads 251–254 are then simultaneously activated according to the respective raster image data during a further rotation of the platen 269. As a result, the first raster scan line is printed in full color. Thereafter, the four heads 251–254 are simultaneously activated during the following rotations of the platen 269, until the cyan ink dots are formed along the last horizontal raster scan line by the cyan head 254. In the next rotation of the platen 269, only the magenta, yellow and black heads 253, 252, 251 are simultaneously operated. When the black head 251 finally reaches the last horizontal raster scan line, only this head 251 is operated to form black ink dots along the last scan line. Thus, the entire image is printed in full color according to successive groups of raster image data corresponding to all the horizontal raster scan lines.

As indicated above, the four heads 254, 253, 252 and 251 are simultaneously operated, except for the initial and terminal portions of the moving stroke of the heads in the axial direction of the platen 269. The length of those initial and terminal portions corresponds to the distance of offset between the black and cyan heads 251, 254 in the axial direction of the platen 269. The printing operations of the heads 251–254 are started in the order beginning with the head 254, and are terminated in the same order.

The required capacity of the dynamic memory 207 which stores the raster image data corresponds to the amount of the raster image data for one vertical scan line multiplied by the number of dots or picture elements which corresponds to the above-indicated offset distance between the black and cyan heads 251 and 254. If the four heads 251–254 are arranged in the circumferential direction of the platen 269 such that the heads 251–254 are not offset from each other in the axial direction of the platen 269, the required capacity of the dynamic memory 207 is equal to the amount of raster image data for one vertical scan line. Thus, the required capacity of the dynamic memory 207 is extremely smaller than the amount of raster image data for one page.

In the present embodiment, the four heads 251–254 are moved intermittently in the axial direction of the platen 269 while the platen 269 is continuously rotated such that the distance of each intermittent movement of the heads 251–254 corresponds to one vertical scan line and one rotation of the platen 269. However, the heads 251–254 may be moved continuously while the platen 269 is continuously rotated such that the distance of movement of the heads corresponding to one full rotation of the platen 269 corresponds to one horizontal raster scan line.

Where the raster image data correspond to the segment data 610 corresponding to bit map data of the original print data, only the black ink jet head 251 is activated to effect printing in black along each horizontal raster scan line.

Figure 15:
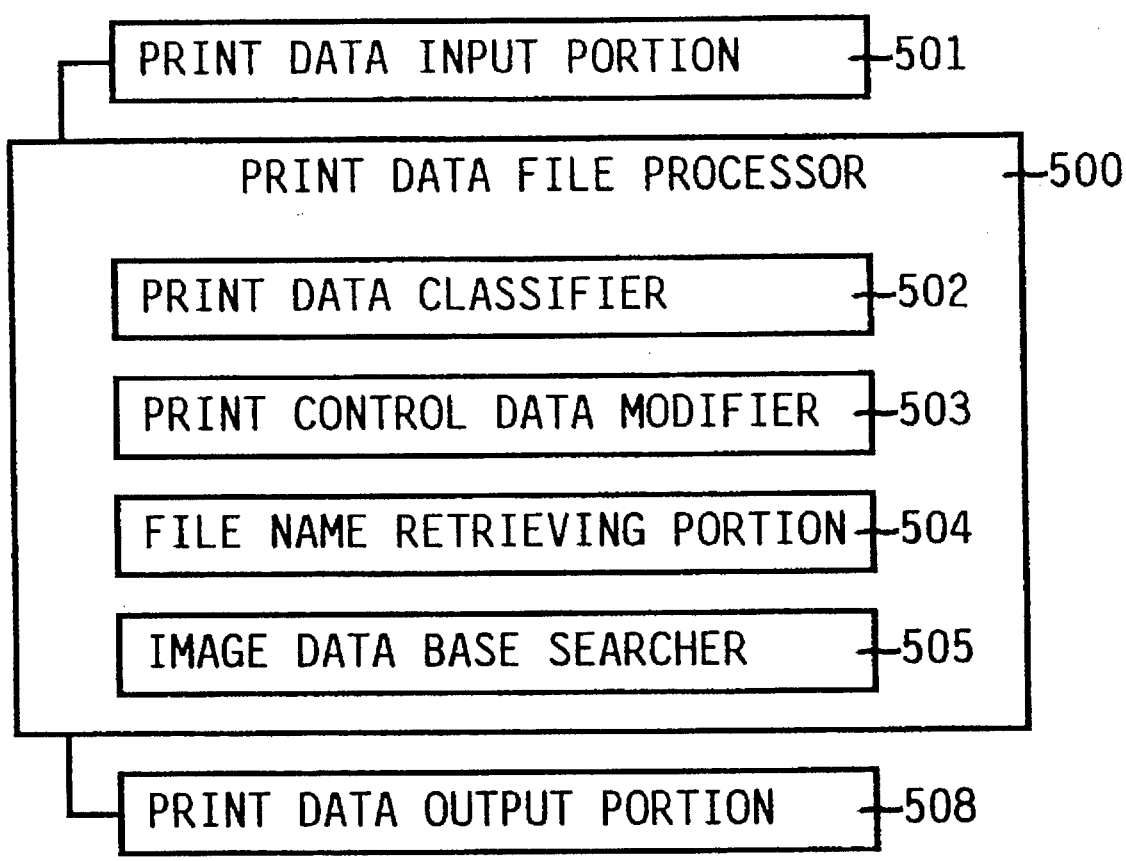
FIG. 15 is a block diagram corresponding to that of FIG. 6, illustrating another embodiment of the present invention.
Figure 16:
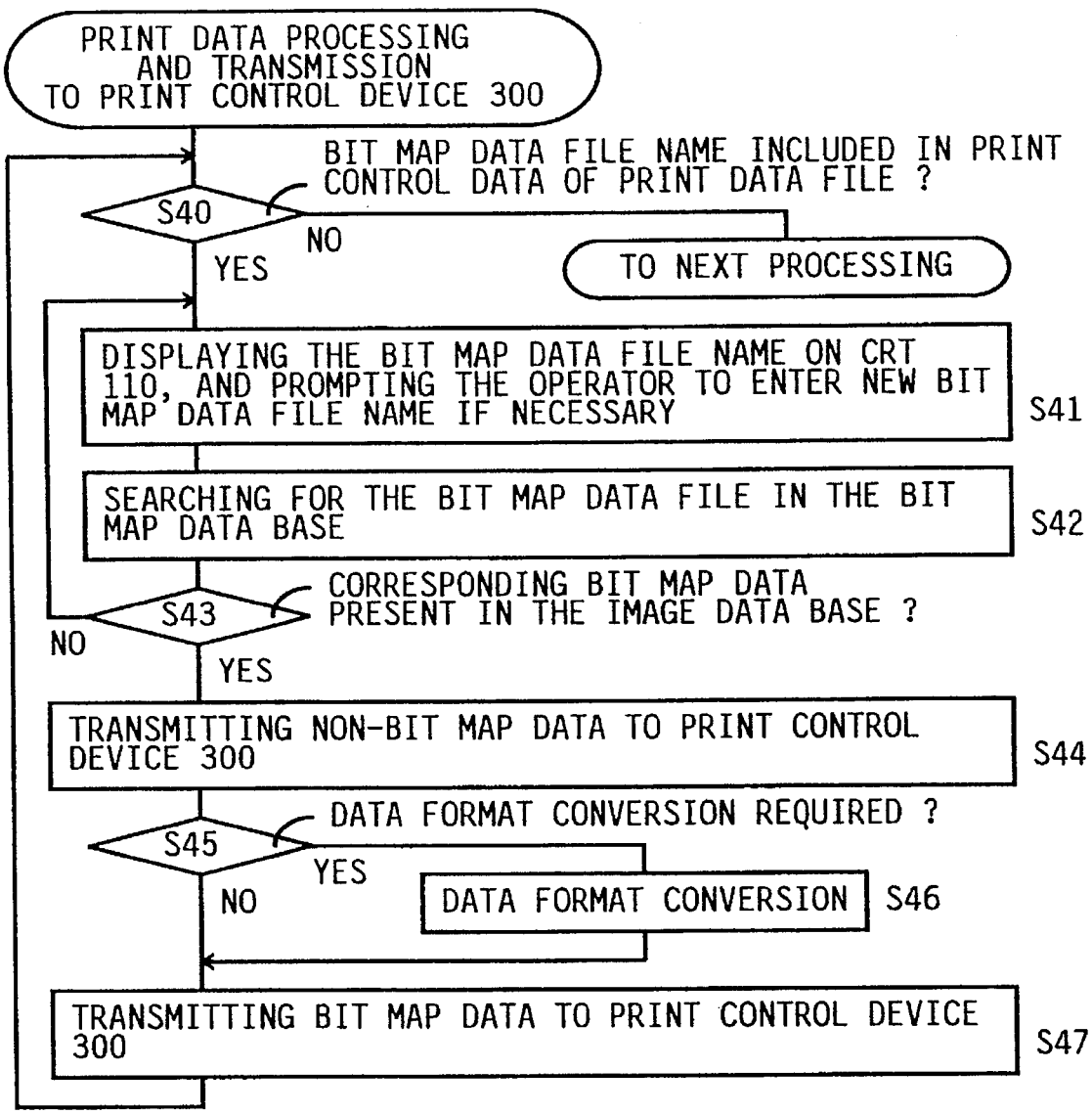
FIG. 16 is a flow chart illustrating a routine for processing print data and transmitting the processed print data to the print control device in the embodiment of FIG. 15.

Referring next to FIGS. 15 and 16, there will be described a modified embodiment of the present invention, wherein a print data output portion 508 shown in FIG. 15 is substituted for the print control data output portion 506 and the image data output portion 507 of FIG. 7. This print data output portion 508 cooperates with the print data input portion 501 and the print data file processor 500 to execute a routine illustrated in FIG. 16, which corresponds to the routine of FIG. 8.

In this modified embodiment, a print data file consists of direct image data in the form of bit map data, and non-direct image data or non-bit map data. The non-bit map data include the print control data (attribute data and print control instruction data) as defined above with respect to the first embodiment, and indirect image data such as character data representative of characters and graphic data representative of graphical or pictorial representations such as graphs and pictures including straight and curved lines. Each set of bit map data is accompanied or preceded by a set of attribute data. Further, the print control data (as part of the non-direct image data or non-bit map data) may include the file name or names of a set or sets of bit map data.

The routine of FIG. 16 is initiated with step S40 to determine whether the file name of any bit map data file stored in the hard disk memory 108 is included in the print control data of the original print data file. If any file name of bit map data file is not included in the print control data, the routine is terminated, and the control goes to a next processing operation as required. If the file name of any bit map data file is detected in the print data file, step S40 is followed by step S41 in which the detected file name is displayed on the CRT 110, and the operator is prompted to enter the file name of another or new set of bit map data through the keyboard 111, if the operator desires to replace the original bit map data set by the new bit map data set.

Then, the control flow goes to steps S42 and S43 to scan the bit map data base to search for the bit map data file identified by the file name displayed on the CRT 110 or entered through the keyboard 111. If the appropriate bit map data file is not found in the hard disk device 108, the control flow goes back to step S41, in which the operator is prompted to change the file name, that is, enter the file name of another new bit map data file stored in the hard disk device 108. If the appropriate bit map data file is found in the hard disk device 108, step S43 is followed by step S44 in which the non-bit map data including the print control data, and indirect image data such as character data and graphic data (if included in the print data file) are transmitted to the print control device 300. The file name included in the print control data informs the print control device 3000 that the corresponding bit map data set will be transmitted separately. Then, the control flow goes to step S45 to determine whether the format of the bit map data set identified by the file name included in the print control data should be changed to meet the format compatible with the print control device 300. If an affirmative decision (YES) is obtained in step S45, the control flow goes to step S46 to change the format of the bit map data set as needed. Then, step S47 is implemented. If a negative decision (NO) is obtained in step S45, this step S45 is directly followed by step S47. In step S47, the bit map data identified by the file name (originally included in the print control data or entered through the keyboard 111) are retrieved from the hard disk device 108, and transmitted to the print control device 300. Thus, the non-bit map data (print control data and indirect image data) and the bit map data (direct image data) are transmitted to the print control device 300 separately from each other.

In the present second embodiment, too, the print control device 300 examines only the non-bit map data to interpret the print control data, and does not have to examine the received print data including a large volume of bit map data, and the processing time required by the print control device 300 can be reduced.

While the present invention has been described above in its presently preferred embodiments, it is to be understood that the invention is not limited to the details of the illustrated embodiments, but may be otherwise embodied.

For instance, the ink jet printer 200 may be replaced by any other type of printer such as a thermal printer, and the hard disk drive 309 of the print control device 300 may be replaced by an electro-optic disk device or a tape drive device. The print control device 300 may be adapted to receive image data of non-interleaved format, such as image data according to TIFF (Tag Image File Format) or PICT.

In the illustrated first embodiment, the image data and the print control data are transmitted to the print control device 300 in the separate transmission mode such that the sets of image data are not interspersed with the sets of attribute data and print control instruction data. However, if the print control device 300 is not adapted to receive a batch of print data from the computer 100 in the separate transmission mode as indicated at F4 in FIG. 9, the image data and the print control data may be transmitted to the print control device 300 in a non-separate transmission mode such that the sets of image data are interspersed with the sets of attribute data and print control instruction data, as indicated at F5 in FIG. 9, as in the original print data file as indicated at F1.

In the illustrated embodiments, the keyboard 111 is used in step S12 of FIG. 8 or S41 of FIG. 16 to enter the file name of a new set of image data which replaces an original set of image data. However, the file name of the set new of image data may be specified by using a directory or a linkage editor.

Although the print control device 300 is spaced from the printer 200 and is electrically connected to the printer 200 through the cable 402, the print control device 300 may be an integral part of the printer 200.

What is claimed is:

1. A print control device interposed between a computer and a printer for processing print data received from said computer so that the processed print data are available on said printer, said print control device comprising:

a first interface circuit for receiving said print data from said computer;

memory means for storing said print data received by said first interface circuit, said print data comprising first direct image data and non-direct image data, which are data other than said first direct image data and comprise print control data for controlling at least a printing operation according to said first direct image data;

data storage controlling means for separately storing in said memory means said first direct image data as a direct image data file and said non-direct image data as a non-direct image data file, said non-direct image data file being separate from said direct image data file;

data converting means for interpreting said non-direct image data of said non-direct image data file stored in said memory means, and converting, when said non-direct image data include indirect image data, said indirect image data into second direct image data;

data synthesizing means for synthesizing said second direct image data obtained by said data converting means, and said first direct image data stored in said memory means; and a second interface circuit for transmitting to said printer said first and second direct image data as synthesized by said data synthesizing means.

2. A print control device according to claim 1, wherein said computer and said printer are spaced from said print control device, and wherein said first and second interface circuits are connected to said computer and said printer, respectively, by respective cables.

3. A print control device according to claim 1, wherein said memory means comprises an external memory, and said print control device further comprises a dynamic memory having a smaller data storage capacity than said external memory, and a direct memory access circuit for direct data transmission among said first and second interface circuits, said dynamic memory and said external memory.

4. A print control device according to claim 1, wherein said direct image data file includes a plurality of first direct image data sets, while said non-direct image data file includes a plurality of print control data sets which correspond to said plurality of first direct image data sets, respectively, and said direct image data file and said non-direct image data file are stored in said memory means such that said plurality of print control data sets are not interspersed with said plurality of first direct image data sets.

5. A print control device according to claim 1, further comprising:
- a dual port memory having two ports so that each of memory cells of said dual port memory are accessible through said two ports;
- a first processing unit connected to one of said two ports of said dual port memory, for controlling data transmission among said dual port memory, said memory means and said second interface circuit; and
- a second processing unit which is connected to the other of said two ports of said dual port memory and which functions as said data converting means and said data synthesizing means.

6. A print control device according to claim 1, wherein said print control device further comprises means for converting said first direct image data into first segment data such that sets of first segment data are sequentially added in the form of a list, and wherein each of said sets of first segment data comprises segment start data indicative of a beginning of a segment, segment end data indicative of an end of said segment, connection data indicative of a pointer in the list, and file name data indicative of a name of said first direct image data, said data converting means comprising means for converting said non-direct image data into second segment data such that sets of second segment data are sequentially added in the form of a list, and wherein each of said sets of second segment data comprise said segment start data, said segment end data, said connection data, and color data indicative of a color of said segment.

7. A print control device according to claim 1, wherein said non-direct image data further comprise at least one of character data representative of characters, and graphic data representative of graphic representations.

8. A method of processing print data received from a computer so that the processed print data are available on a printer, said method comprising:
- a storing step of separately storing in memory means said print data received from said computer, such that first direct image data included in said print data are stored as a direct image data file, while non-direct image data included in said print data are stored as a non-direct image data file, said non-direct image data file being separate from said direct image data file, said non-direct image data being data other than said first direct image data and comprising indirect image data and print control data for controlling at least a printing operation according to said first direct image data;
- a converting step of interpreting said non-direct image data of said non-direct image data file stored in said memory means, and converting said indirect image data into second direct image data;
- a synthesizing step of synthesizing said second direct image data obtained in said converting step, and said first direct image data stored in said memory means; and
- a transmitting step of transmitting to said printer said first and second direct image data as synthesizing in said step of synthesizing said second and first direct image data.

9. A method according to claim 8, wherein said direct image data file includes a plurality of first direct image data sets, while said non-direct image data file includes a plurality of print control data sets which correspond to said plurality of first direct image data sets, respectively, and said direct image data file and said non-direct image data file are stored in said memory means such that said plurality of print control data sets are not interspersed with said plurality of first direct image data sets.

* * * * *